(12) United States Patent
Oomori et al.

(10) Patent No.: US 7,387,857 B2
(45) Date of Patent: Jun. 17, 2008

(54) LIQUID CRYSTALLINE DI(METH)ACRYLATE COMPOUND, PHASE DIFFERENCE FILM, OPTICAL FILM, POLARIZING PLATE, LIQUID CRYSTAL PANEL AND LIQUID CRYSTAL DISPLAY DEVICE

(75) Inventors: Yutaka Oomori, Ibaraki (JP); Hisae Sugihara, Ibaraki (JP); Shuusaku Nakano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 280 days.

(21) Appl. No.: 11/199,379

(22) Filed: Aug. 9, 2005

(65) Prior Publication Data

US 2006/0040071 A1    Feb. 23, 2006

(30) Foreign Application Priority Data

Aug. 19, 2004  (JP)  ............... 2004-239594
Aug. 19, 2004  (JP)  ............... 2004-239598

(51) Int. Cl.
  *C09K 19/00*  (2006.01)
  *C09K 19/52*  (2006.01)
(52) U.S. Cl. ............... 430/20; 430/270.1; 252/299.01; 428/1.1
(58) Field of Classification Search ............ 252/299.01; 430/20, 270.1; 428/1.1
See application file for complete search history.

(56) References Cited

U.S. PATENT DOCUMENTS

| | | | |
|---|---|---|---|
| 6,961,106 B2 * | 11/2005 | Kashima | ............ 349/117 |
| 2002/0018863 A1 | 2/2002 | Ichihashi | |
| 2003/0076468 A1 | 4/2003 | Ichihashi | |
| 2003/0219548 A1 | 11/2003 | Meyer et al. | |
| 2005/0074564 A1 * | 4/2005 | Yamaoka et al. | ............ 428/1.1 |
| 2006/0158076 A1 * | 7/2006 | Kondou et al. | ............ 313/110 |
| 2007/0202273 A1 * | 8/2007 | Hirai et al. | ............ 428/1.31 |

FOREIGN PATENT DOCUMENTS

JP    08-283718 A    10/1996

OTHER PUBLICATIONS

Extended European Search Report dated Nov. 23, 2005, issued in corresponding European Application No. 05017021.6.
R.A.M. Hikmet, J. Lub, and A. J. W. Tol: "Effect of the Orientation of the Ester Bonds on the Properties of Three Isomeric Liquid Crystal Diacrylates before and after Polymerization" Macromolecules, vol. 28, 1995, p. 3313-3327, XP008054766.

* cited by examiner

*Primary Examiner*—Geraldina Visconti
(74) *Attorney, Agent, or Firm*—Westerman, Hattori, Daniels & Adrian, LLP.

(57) ABSTRACT

A phase difference film characterized in that said film is obtained by orienting and fixing, on a substrate, a composition containing a polymerizable liquid crystal monomer represented by the following formula (I):

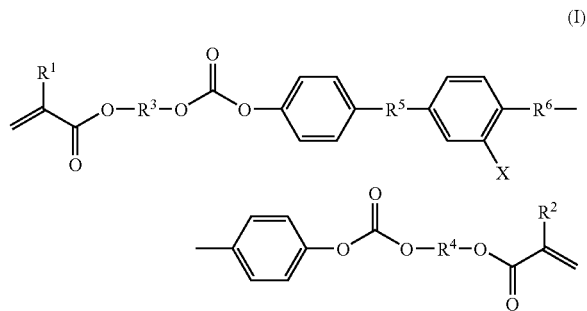

wherein, in the formula (I), X represents any one of Br, a halogen atom other than Br, -SMe and -SPh, $R^1$ and $R^2$ represent each independently a hydrogen atom or a methyl group, $R^3$ and $R^4$ represent each independently an alkylene group of a carbon number of 2 to 12, and $R^5$ and $R^6$ represent each independently —O—CO— or —CO—O—.

15 Claims, 1 Drawing Sheet

LIQUID CRYSTALLINE DI(METH)ACRYLATE COMPOUND, PHASE DIFFERENCE FILM, OPTICAL FILM, POLARIZING PLATE, LIQUID CRYSTAL PANEL AND LIQUID CRYSTAL DISPLAY DEVICE

BACKGROUND OF THE INVENTION

1. Field of the Invention

The present invention relates to a liquid crystalline di(meth)acrylate compound, a phase difference film, an optical film, a polarizing plate, a liquid crystal panel and a liquid crystal display device.

2. Description of the Related Art

A phase difference film is an optical film used for converting linearly polarized light into circularly polarized light or elliptically polarized light, or conversely converting circularly polarized light or elliptically polarized light into linearly polarized light. As a phase difference film, phase difference films obtained by stretching a polymer film such as polycarbonate and polystyrene have been previously used.

However, since the polymer film has usually a thickness of about 40 to 100 μm, for example, when the film is applied to a liquid crystal display device, thinning of which is desired, a thinner phase difference film is desired.

Then, as a substitute for the stretched polymer film, a phase difference film using a liquid crystal monomer is paid an attention (for example, see Macromolecules, 1995, 28, 3313-3327). Usually, a retardation value of a phase difference film is determined by a product of a birefringence index (Δn) and a thickness, but since a liquid crystal monomer has great Δn, the liquid crystal monomer has an advantage, when one intends to obtain a prescribed retardation value, a thickness of a phase difference film can be advantageously reduced.

As the aforementioned phase difference film, for example, an optical film obtained by coating a mixed solution containing a liquid crystal monomer on a substrate, orienting this uniformly, and irradiating with ultraviolet-ray to cure it has been proposed (for example, see Japanese Patent Application Laid-Open (JP-A) No. 8-283718). Examples of property that the liquid crystal monomer is required to have when such the optical film is used as a phase difference film include not only excellent transparency of a cured film, but also better solubility in a solvent, uniform orientation of the liquid crystal monomer, better crosslinking property (curability) with ultraviolet-ray, and uniform fixation of the orientation state.

However, since the previous liquid crystal monomer has Δn greater than 0.10, when one tries to manufacture a phase difference film having a small retardation value using the liquid crystal monomer, a designed value of a thickness of a film is usually extremely small as about 1 μm, and it is extremely difficult to control a thickness. In addition, there is a problem that a small variation in a thickness manifests a great variation in a retardation value, and this deteriorates display uniformity of a liquid crystal display device.

In particular, in recent years, enlargement and high functionalization of a liquid crystal monitor, a liquid crystal television and the like have been rapidly progressed and, in various optical films such as a polarizing plate and a phase difference film used in them, further improvement in property and further improvement in quality are desired. Under such the circumstances, as the aforementioned liquid crystal monomer, development of a phase difference film using a liquid crystal monomer exhibiting further smaller Δn (e.g. 0.10 or smaller) than usual has been desired.

SUMMARY OF THE INVENTION

The present invention was done in view of such the prior art, and an object of the present invention is to provide a phase difference film which is excellent in transparency, is excellent in productivity without required to have an extremely high coating precision, and has better optical uniformity, and a liquid crystalline di(meth)acrylate compound which can afford such the phase difference film. In addition, another object of the present invention is to provide an optical film, a polarizing plate, a liquid crystal panel and a liquid crystal display device using this phase difference film.

In order to solve the aforementioned problems, the present inventors intensively studied and, as a result, found out that, when a phase difference film is manufactured using a particular liquid crystal monomer, the aforementioned problems can be solved, which resulted in completion of the present invention.

That is, the present invention provides a phase difference film characterized in that said film is obtained by orienting and fixing a composition containing a polymerizable liquid crystal monomer represented by the following formula (I) on a substrate.

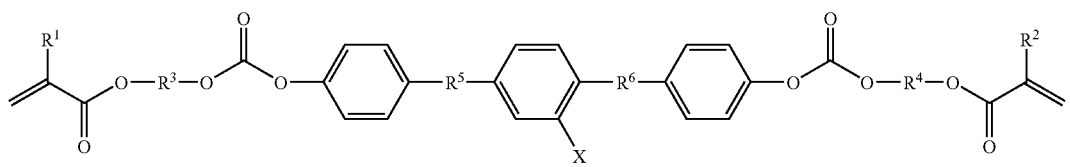

(I)

wherein, in the formula (I), X represents any one of Br, a halogen atom, -SMe and -SPh, $R^1$ and $R^2$ represent each independently a hydrogen atom or a methyl group, $R^3$ and $R^4$ represent each independently an alkylene group of a carbon number of 2 to 12, and $R^5$ and $R^6$ represent each independently —O—CO— or —CO—O—.

It is preferable that the polymerizable liquid crystal monomer is a polymerizable liquid crystal monomer represented by the following formula (II).

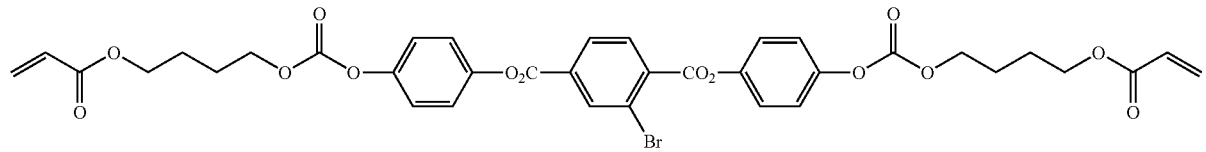

(II)

Also, the present invention provides a liquid crystalline di(meth)acrylate compound characterized in that it is represented by the following formula (III), and a phase difference film obtained by orienting and fixing a composition containing this liquid crystalline (di)methacrylate compound on a substrate.

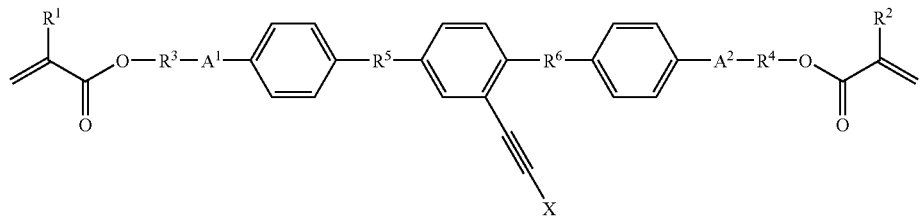

(III)

wherein, in the formula (III), $R^1$ and $R^2$ represent each independently a hydrogen atom or a methyl group, $R^3$ and $R^4$ represent each independently an alkylene group of a carbon number of 2 to 12, $R^5$ and $R^6$ represent each independently —O—CO— or —CO—O—, $A^1$ and $A^2$ represent each independently —O— or —O—CO—O—, and X represents an aromatic substituent.

The X can be a phenyl group or a naphthyl group which is not substituted or has a substituent (including the case where one or two carbon atoms of the substituent is substituted with a nitrogen atom), or a thiophenyl group, a furanyl group or a pyrrolyl group which is not substituted or has a substituent. In addition, the $R^3$ and $R^4$ can be each independently an alkylene group of a carbon number of 2 to 6, and the X can be a phenyl group.

A birefringence index of the polymerizable liquid crystal monomer at a wavelength of 589 nm, and a birefringence index of the liquid crystalline di(meth)acrylate compound at a wavelength of 589 nm are preferably 0.01 to 0.10.

Preferably, the composition is cured by irradiation with ultraviolet-ray, and an irradiation amount of the ultraviolet-ray is 100 to 1500 mJ/cm$^2$.

In addition, it is preferable that a thickness of a composition after oriented and fixed on the substrate is 1 to 10 μm.

Preferably, a light transmittance of the phase difference film at a wavelength of 590 nm is 80% or more.

In addition, it is preferable that a retardation value Re (590) in a phase difference film plane at a wavelength of 590 nm satisfies the following equation (1).

$$80 \text{ nm} \leq Re(590) \leq 800 \text{ nm} \quad (1)$$

wherein, Re (590)=(nx−ny)×d, nx means a refractive index in a slow axis direction (direction at which a refractive index in a phase difference film plane becomes maximum) of a phase difference film, ny means a refractive index of a phase difference film in a fast axis direction, and d[nm] means a thickness of a phase difference film.

In addition, the present invention is provided as an optical film characterized in that the phase difference film is laminated.

The present invention is also provided as a polarizing plate characterized in that the phase difference film or the optical film is disposed at least on one side of a polarizer.

In addition, the present invention is provided as a liquid crystal panel characterized in that said panel is provided with the phase difference film, the optical film or the polarizing plate, and a liquid crystal cell.

Preferably, the liquid crystal cell is TN mode, VA mode, IPS mode or OCB mode.

Further, the present invention is also provided as a liquid crystal display device characterized in that said device is provided with the liquid crystal panel.

According to the present invention, a phase difference film which is excellent in transparency, can suppress a variation in a retardation value, and is excellent in productivity without requiring to have an extremely high coating precision, and an optical film, a polarizing plate, a liquid crystal panel and a liquid crystal display device using this can be obtained.

DESCRIPTION OF THE PREFERRED EMBODIMENTS

First Embodiment

Figure 1:
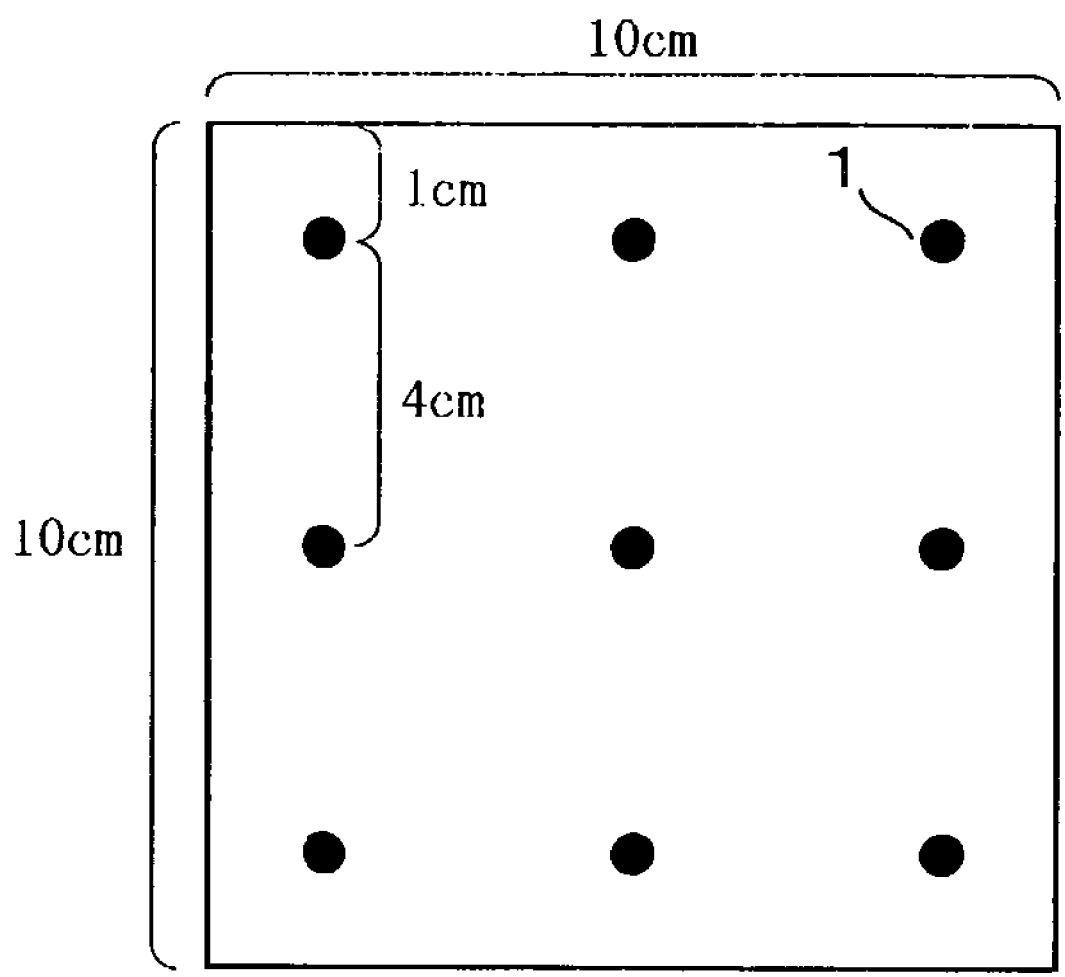
FIG. 1 is a plane view showing places of a phase difference film to be measured with a spectroellipsometer.

A phase difference film relating to a first embodiment of the present invention is obtained by orienting and fixing, on a substrate, a composition containing a polymerizable liquid crystal monomer (hereinafter, referred to as liquid crystal monomer (I)) of a particular structure represented by the following formula (I) not only having a carbonate structure on its main chain but also having a bromine-substituted phenylene group at a center.

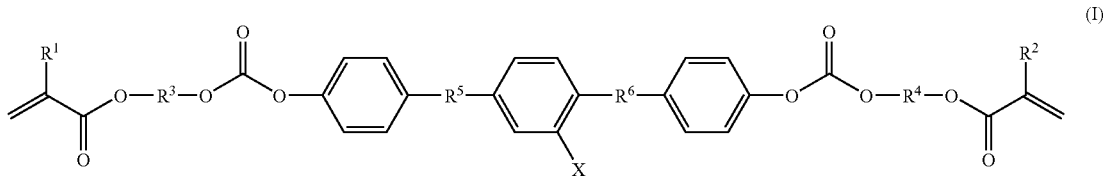

wherein, in the formula (I), X represents any one of Br, a halogen atom other than Br, -SMe and -SPh, $R^1$ and $R^2$ represent each independently a hydrogen atom or a methyl group, $R^3$ and $R^4$ represent each independently an alkylene group of a carbon number of 2 to 12, and $R^5$ and $R^6$ represent each independently —O—CO— or —CO—O—.

Such the liquid crystal monomer (I) has a structure in which an ortho position (lateral position) of a phenylene group at a central part of a main chain is substituted with any one of a bromine atom (Br), a halogen atom other than Br, -SMe and -SPh. When light enters a phase difference film obtained by orienting and fixing a composition containing such the liquid crystal monomer (I) on a substrate, an extraordinary ray is transmitted in a direction of a main chain, and an ordinary ray is transmitted in a direction of a lateral position. Herein, a lateral position of a liquid crystal monomer (I) is substituted with a bromine atom. For this reason, for example, as compared with the case where a lateral position is not substituted or substituted with a methyl group, since a bromine atom is sterically highly bulky, and has great atomic refraction, a refractive index ($n_e$) of an extraordinary ray becomes small and, conversely, a refractive index ($n_o$) of an ordinary ray becomes large and, as a result, it is thought that a birefringence index $\Delta n$ ($=n_e-n_o$) becomes small.

In the formula (I), $R^1$ and $R^2$ represent each independently a hydrogen atom or a methyl group and, from a viewpoint that closslinking of a liquid crystal monomer (I) is rapid, it is preferable that both of $R^1$ and $R^2$ are hydrogen atoms.

In addition, $R^3$ and $R^4$ represent each independently an alkylene group of a carbon number of 2 to 12 and, from a viewpoint that a liquid crystal temperature range is wide, and better orienting property is obtained, it is preferable that both of $R^3$ and $R^4$ are alkylene groups of a carbon number of 2 to 6.

Further, $R^5$ and $R^6$ represent each independently —O—CO— or —CO—O— and, from a viewpoint of stability and a cost of a raw material, it is preferable that both of $R^5$ and $R^6$ are —O—CO—.

From the foregoing points, in the present embodiment, among the liquid crystal monomer (I), a monomer represented by the following formula (II) (hereinafter, referred to as liquid crystal monomer (II)) can be particularly preferably used.

A process of preparing a liquid crystal monomer (I) is not particularly limited, but the monomer can be obtained, for example, by an esterification reaction of 1 equivalent of bromoterephthalic acid and 2 equivalents of a phenolic compound represented by the following formula (IV) (hereinafter, referred to as phenol (IV)).

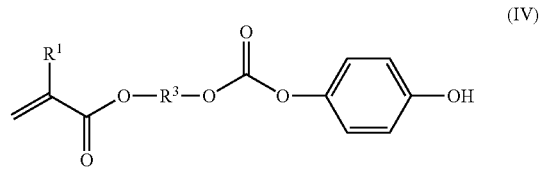

wherein, in the (IV), $R^1$ represents independently a hydrogen atom or a methyl group, and $R^3$ represents independently an alkylene group of a carbon number of 2 to 12. In this esterification reaction, the bromoterephthalic acid is activated by acid chloride, phosphorus pentachloride or the like, and this is reacted with phenol (IV), thereby, an objective product can be simply synthesized. Alternatively, using a condensing agent such as DCC (dicyclohexylcarbodiimide), bromoterephthalic acid and phenol (IV) may be directly reacted.

A birefringence index ($\Delta n$) of the polymerizable liquid crystal monomer (liquid crystal monomer (I) or liquid crystal monomer (II)) at a wavelength of 589 nm is preferably 0.01 to 0.10, further preferably 0.03 to 0.09, particularly preferably 0.05 to 0.09, and most preferably 0.07 to 0.09. In the aforementioned range, even when a phase difference film of a small retardation value is prepared, a phase difference film having better display uniformity can be prepared. A birefringence index ($\Delta n$) of the polymerizable liquid crystal monomer indicates a difference between a refractive index ($n_e$) of an extraordinary ray and a refractive index ($n_o$) of an ordinary ray as described above. For measuring $n_e$ and $n_o$, an Abbe refractometer ("DR-M4" manufactured by Atago Co., Ltd.) can be used as described in "Base and Application of Liquid Crystal" authored by Shoichi Matsumoto published by Kogyo Chosakai Publishing Inc. (1991 edition), p. 45.

The phase difference film relating to the present embodiment is obtained by orienting and fixing, on a substrate, a

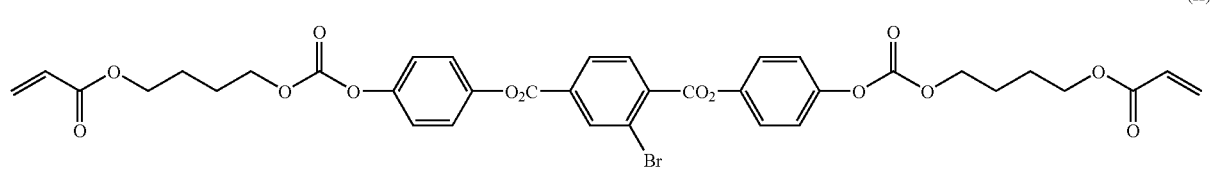

composition containing a polymerizable liquid crystal monomer (liquid crystal monomer (I), preferably liquid crystal monomer (II)) of a particular structure, as described above. To explain more specifically, the phase difference film relating to the present embodiment is obtained by coating, on a substrate, a mixed solution of a composition containing the polymerizable liquid crystal monomer and a polymerization initiator, and a solvent, and curing this.

An amount of the polymerizable liquid crystal monomer to be blended is preferably 70 to 99 parts by weight, more preferably 75 to 99 parts by weight, further preferably 80 to 99 parts by weight relative to 100 parts by weight of a total solid matter of the mixed solution.

The polymerization initiator is used for enhancing a closslinking reaction rate and a closslinking reaction ratio of the polymerizable liquid crystal monomer. A kind of a polymerization initiator is not particularly limited, but a photopolymerization initiator, a water-soluble azo polymerization initiator, an oil-soluble azo polymerization initiator, a polymer azo polymerization initiator, a photocationic initiator, a radical-based photopolymerization initiator and the like can be used. Preferably, a photopolymerization initiator is used.

A photopolymerization initiator is not particularly limited, but may be a photopolymerization initiator consisting of a single compound, or a photopolymerization initiator obtained by mixing two or more kinds of different photopolymerizable initiators. Examples of a photopolymerization initiator include an acetophenone-based compound, a benzoin-based compound, a benzophenone-based compound, and a thioxanthone-based compound. Alternatively, for example, a photopolymerizable initiator such as trade name "Irgacure 651", "Irgacure 184", "Darocure-1173", "Irgacure 500", "Irgacure 2959", "Irgacure 907", "Irgacure 369", "Irgacure 819", and "Irgacure 784" manufactured by Ciba Specialty Chemicals may be used. Furthermore, trade name "Darocure-953", and "Darocure-1116" manufactured by Merck, and trade name "Kayacure-MBP", "Kayacure-CTX", "Kayacure-DITX", "Kayacure-CTX", "Kayacure-DETX", "Kayacure-RTX" manufactured by Nippon Kayaku Co., Ltd., and the like may be used.

In order to promote a polymerization reaction, an assistant may be added to the photopolymerization initiator. Examples of the assistant include amine-based compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, ethyl 4-dimethylaminobenzoate (n butoxy), and isoamyl 4-dimethylaminobenzoate.

An amount of the polymerization initiator to be added is not particularly limited, but is preferably 0.5 to 20 parts by weight, and more preferably 2 to 15 parts by weight relative to 100 parts by weight of the polymerizable liquid crystal monomer. An amount of an assistant to be added is preferably about 0.5 to 2-fold amount relative to a polymerization initiator (photopolymerization initiator).

The solvent is used for uniformly dispersing or dissolving the polymerizable liquid crystal monomer and the polymerization initiator. Such the solvent is not particularly limited as far as it is excellent in dissolving a composition containing the polymerizable liquid crystal monomer and the polymerization initiator, and does not reduce wettability of a substrate or orienting property of a composition upon coating of the composition on a substrate.

Specifically, as the solvent, for example, aromatic hydrocarbons such as benzene, toluene, xylene, methoxybenzene, and 1,2-dimethoxybenzene, halogenated hydrocarbons such as chloroform, dichloromethane, carbon tetrachloride, dichloroethane, tetrachloroethane, trichloroethylene, tetrachloroethylene, chlorobenzene, and orthodichlorobenzene, phenols such as phenol, and parachlorophenol, ethers such as diethyl ether, dibutyl ether, tetrahydrofuran, anisole, dioxane, and tetrahydrofuran, ketones such as acetone, methyl isobutyl ketone, methyl ethyl ketone, cyclohexanone, cyclopentanone, 2-pentanone, 3-pentanone, 2-hexanone, 3-hexanone, 2-heptanone, 3-heptanone, 4-heptanone, 2,6-dimethyl-4-heptanone, 2-pyrrolidone, and N-methyl-2-pyrrolidone, alcohols such as n-butanol, 2-butanol, cyclohexanol, isopropyl alcohol, t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol, amides such as dimethylformamide, and dimethylacetamide, nitriles such as acetonitrile, and butyronitrile, cellosolves such as methylcellosolve, and methyl acetate cellosolve, and esters such as ethyl acetate, butyl acetate, and methyl lactate can be used. Other examples of the solvent include methylene chloride, carbon bisulfide, ethylcellosolve, and butylcellosolve, but are not limited to them.

It is preferable to use, as the solvent, cyclopentanone, cyclohexanone, methyl isobutyl ketone, methyl ethyl ketone, tetrahydrofuran, toluene, or ethyl acetate in that the solvent does not substantially erode a substrate, and can sufficiently dissolve the composition.

The solvents may be used alone, or two or more kinds of arbitrary solvents may be used by mixing them for the purpose of enhancing smoothness of a phase difference film. A total solid matter concentration of the mixed solution is different depending on solubility, coating viscosity, wettability on a substrate, a thickness after coating and the like, and in order to obtain a phase difference film having high smoothness, a solid matter is dissolved at preferably 2 to 100 parts by weight, further preferably 20 to 80 parts by weight, and particularly preferably 30 to 60 parts by weight relative to 100 parts by weight of solvent.

In addition, when wettability of the mixed solution on the substrate is poor, or when surface uniformity of a phase difference film is worse, in order to improve them, various leveling agents may be added to the mixed solution. As a kind of a leveling agent, various compounds such as silicone series, fluorine series, polyether series, acrylic acid copolymer series, and titanate series can be used. An amount of these leveling agents to be added is not particularly limited, but in order to enhance smoothness, and in order that orientation of a composition containing a polymerizable liquid crystal monomer and a polymerization initiator is not disturbed, the amount is preferably 0.005 to 0.20 parts by weight, and more preferably 0.010 to 0.10 parts by weight relative to 100 parts by weight of a solid matter of the mixed solution.

In addition to a polymerizable liquid crystal monomer, a polymerization initiator and a solvent, a polymerizable chiral agent or a vertical orientation treating agent may be added to the mixed solution. Such the polymerizable chiral agent or vertical orientation treating agent is used for changing the orientation state of a polymerizable liquid crystal monomer.

The polymerizable chiral agent can manifest a cholesteric liquid crystal phase. A cholesteric liquid crystal phase refers to a liquid crystal phase in which a uniform spiral structure of the polymerizable liquid crystal monomer is formed. Usually, since a cholesteric liquid crystal phase can be regarded as a pseudo-layer structure, and an orientation vector of a liquid crystal molecule is periodically changed using a spiral pitch as a repetition unit, when a spiral axis (helical axis) is parallel with a substrate normal line direction, a refractive index in a thickness direction becomes smaller as compared with a refractive index in a film plane.

In a phase difference film prepared from a mixed solution containing the polymerizable chiral agent in addition to the polymerizable liquid crystal monomer, polymerization initiator and solvent, since a refractive index in a thickness direction becomes smaller as compared with a refractive index in a film plane, letting two main refractive indices in a film plane to be nx and ny, and a refractive index in a direction of a thickness to be nz, the phase difference film can be used as a phase difference film having property of nx≈ny>nz (so-called negative C plate). Such the negative C plate is disposed between a liquid crystal cell and a polarizing plate, and can be suitably used for improving visual field angle property from an oblique direction.

The polymerizable chiral agent is not particularly limited as far as it has at least one polymerizable functional group, and has a functional group having an asymmetric carbon atom in a molecular structure (optically active group), and does not disturb orientation of a polymerizable nematic liquid crystalline compound. Examples of the polymerizable functional group include an acryloyl group, a methacryloyl group, an epoxy group, and a vinyl ether group and, among them, an acryloyl group or a methacryloyl group is preferable. The polymerizable chiral agent exhibiting a cholesteric liquid crystal phase is preferably used whether the agent has liquid crystallizability.

An amount of the polymerizable chiral agent to be added is preferably 4.5 to 25 parts by weight relative to 100 parts by weight of a total solid matter in the mixed solution. More preferably, 4.5 to 20 parts by weight, and further preferably 4.5 to 15 parts by weight is added.

Examples of the vertical orientation treating agent include a homeotropic orienting side chain-type liquid crystal polymer described in JP-A No. 2003-149441. Such the homeotropic orienting side chain-type liquid crystal polymer is used for vertically orienting the polymerizable liquid crystal monomer in a film normal line direction (also referred to as homeotropic orientation).

In a phase difference film prepared from a mixed solution containing the vertical orientation treating agent in addition to the polymerizable liquid crystal monomer, polymerization initiator and solvent, since a refractive index in a direction of a thickness becomes larger as compared with a refractive index in a film plane, letting two main refractive indices in a film plane to be nx and ny, and a refractive index in a direction of a thickness to be nz, the phase difference film can be used as a phase difference film having property of nz>nx≈ny (so-called positive C plate). Such the positive C plate is disposed between a liquid crystal cell and a polarizing plate, and can be suitably used for improving visual angle property from an oblique direction.

An amount of the vertical orientation treating agent to be added is preferably 1 to 25 parts by weight relative to 100 parts by weight of a total solid matter in the mixed solution. More preferably 2 to 20 parts by weight, and further preferably 3 to 15 parts by weight is added.

The substrate is used for uniformly spreading a polymerizable liquid crystal monomer and a polymerization initiator and, thereafter, obtaining the uniform orientation state. Examples of a material for forming such the substrate include a polyester-based resin such as polyethylene terephthalate and polyethylene naphthalate, a cellulose-based resin such as diacetylcellulose and triacetylcellulose, an acryl-based resin such as polymethyl methacrylate, a styrene-based resin such as polystyrene, an acrylonitrile-styrene copolymer, a styrene resin, an acrylonitrile styrene resin, an acrylonitrile-butadiene-styrene resin, an acrylonitrile-ethylene-styrene resin, a styrene-maleimide copolymer, and a styrene-maleic anhydride copolymer, and a polycarbonate-based resin. Other examples include a polyolefin-based resin such as a cyclo-based olefin resin, a norbornene-based resin, polyethylene, polypropylene, and an ethylene-propylene copolymer, a vinyl chloride-based resin, an amide-based resin such as nylon and aromatic polyamide, an imide-based resin such as aromatic polyimide and polyimideamide, a sulfone-based resin, a polyethersulfone-based resin, a polyether ether ketone-based resin, a polyphenylene sulfide-based resin, a vinyl alcohol-based resin, a vinylidene chloride-based resin, a vinylbutyral-based resin, an arylate-based resin, a polyoxymethylene-based resin, and an epoxy-based resin. Further examples include a polymer film substrate comprising a blend of the aforementioned resins. Further examples include various substrates such as a metal substrate such as aluminum, iron, and copper, a glass substrate such as a blue plate glass, an alkali glass, an alkali-free glass, a borosilicate glass, a flint glass, and a quartz glass, and a ceramic substrate, as well as various semiconductor substrates such as silicon wafer.

It is particularly preferable to use polyethylene terephthalate as the substrate in that it is not eroded by the solvent, and uniform orientation of the composition can be induced.

In addition, as the substrate, commercially available polymer films and the previous known polymer films can be used. Examples include trade name "Fujitack" manufactured by Fuji Photo Film Co., Ltd., trade name "Zeonor" manufactured by Zeon Corporation, and trade name "Arton" manufactured by JSR. Alternatively, a polymer film containing an alternate copolymer consisting of isobutylene and N-methylmaleimide, and an acrylonitrile-styrene copolymer described in JP-A No. 2001-343529 may be used. As the substrate, other film, for example, an organic film (also referred to as oriented film) such as a polyimide film, a polyamide film, and a polyvinyl alcohol film, or an obliquely deposited film of silicon oxide may be disposed on a surface thereof. Alternatively, when the substrate is a polymer film, the film may be subjected to stretching treatment or shrinking treatment to impart anisotropy to a film plane.

Examples of a method of orienting the composition on the substrate include a rubbing method, an obliquely depositing method, a microgroove method, a stretching polymer film method, a LB (Langmuir Blobgett) film method, a transferring method, a light irradiating method (photoisomerization, photopolymerization, photodegradation etc.), and a peeling method. Alternatively, an orientation treating method using the magnetic field, the electric field, a shearing stress or the like may be used. From a viewpoint of easiness of a manufacturing step, it is preferable to use a rubbing method or an optical orienting method as an orientation treating method.

An orienting film used in the rubbing method is not particularly limited, but films which are excellent in wettability with the mixed solution, and can orient a composition containing a polymerizable liquid crystal monomer, a polymerizable chiral agent and a polymerization initiator in a particular direction are preferable. Examples of such the orientation film include orientation films formed by coating polyamide, polyimide, lecithin, silica, polyvinyl alcohol, ester-modified polyvinyl alcohol, a polymer in which a saponification degree of polyvinyl acetate is regulated, or a silane coupling agent. Alternatively, a surface of the substrate as it is may be orientation-treated by a rubbing method.

An orientation film used in the optical orientation method is not particularly limited, but an isomerization polymer, an optical dimerization polymer and a photodegradation polymer can be used. These polymers can induce orientation of a composition containing a polymerizable liquid crystal monomer, a polymerizable chiral agent and a polymerization initiator by irradiation with radiation. Radiation to be used may be any of ultraviolet-ray, visible light, and infrared-ray. These radiations may be polarized light or non-polarized light. Examples of a preferable optical orientation material include a cinnamic acid derivative described in U.S. Pat. No. 6,160, 597. Such the optical orientation material can be oriented and crosslinked by linearly polarized ultraviolet-ray.

A method of coating of the mixed solution on a substrate is not particularly limited, but the previously known coating method can be used. For example, thin layer spreading of the mixed solution may be performed by a spin-coating method, a roll coating method, a flow coating method, a printing method, a dip coating method, a casting film making method, a bar coating method, or a gravure printing method. A coating thickness of the mixed solution is usually 2 to 300 μm, more preferably 2 to 200 μm, particularly preferably 2 to 50 μm. When a thickness is within the aforementioned range, films excellent in optical uniformity can be manufactured.

A substrate on which the mixed solution is coated may be drying-treated, if necessary, before the composition is fixed on a substrate. A temperature in drying treating (also referred to as drying temperature) is not particularly limited, but a preferable drying temperature (Tt) is not lower than a crystal phase (or a glass phase)-liquid crystal phase transition temperature (referred to as Tg) of a composition containing a polymerizable liquid crystal monomer and a polymerization initiator and lower than a liquid crystal phase-isotropic phase transition temperature (referred to as Ti) of the composition. In addition, the temperature is preferably not higher than a glass transition temperature of a substrate. Further preferably, Tg+2° C.≦Tt<Ti, and most preferably, Tg+3° C.≦Tt<Ti. When the temperature is within the aforementioned temperature range, a phase difference film having high uniformity can be manufactured. A drying time is not particularly limited, but in order to obtain a phase difference film having better optical uniformity, the time is for example, 30 seconds to 20 minutes, preferably 1 to 15 minutes, further preferably 1 to 10 minutes.

A specific method of retaining the drying temperature constant is not particularly limited, but examples include the known heating method and temperature controlling method using a heater utilizing the hot air, a microwave or far infrared-ray, a roll, a heat pipe roll or a metal belt heated for temperature regulation.

When a variation of the drying temperature is great, a variation in a thickness of a coated surface becomes great, leading to a variation in a retardation value of the finally obtained phase difference film. Therefore, a temperature variation in a film plane direction of a phase difference film is preferably as small as possible, and it is desirable that a temperature variation in a plane direction is within ±1° C.

Examples of a method of fixing the composition include a method by heating, and a method by irradiation with radiation. However, when a method by heating is adapted, since there is a possibility that isotropic phase transition is caused in a polymerizable liquid crystal monomer, and unacceptable orientation is generated, it is preferable to adopt a method by irradiation with radiation. Radiation irradiation is used for fixing the oriented state of a polymerizable liquid crystal monomer by curing a polymerizable liquid crystal monomer by a crosslinking reaction.

An example of the radiation is not particularly limited, but examples include gamma ray, electron beam, visible light, and ultraviolet-ray. From a viewpoint of easy manufacturing, irradiation with ultraviolet-ray is used. A wavelength of a light source in ultraviolet-ray irradiation is determined depending on a wavelength region in which a photochemical reactive compound used has optical absorption. Generally, 190 nm to 400 nm is preferable. Further preferable is 250 nm to 380 nm. As a light source having such the wavelength property, a superhigh pressure mercury lamp, a flash mercury lamp, a high pressure mercury lamp, a low pressure mercury lamp, a deep UV lamp, a xenon lamp, a xenon flash lamp or a metal halide lamp is preferably used. Ultraviolet-ray emitted from a light source may be non-polarized light or polarized light.

A position of a light source in the radiation irradiation is not particularly limited, but a light source may be disposed on a side of coating of the mixed solution, or may be disposed on a substrate side opposite thereto. In addition, the atmosphere in the air in the radiation irradiation is not particularly limited, but the air atmosphere, the nitrogen atmosphere, or the argon atmosphere may be used.

An irradiation amount of ultraviolet-ray is not particularly limited, but preferably 100 to 1500 mJ/cm$^2$, further preferably 100 to 800 mJ/cm$^2$. When an irradiation amount is the irradiation amount within the aforementioned range, a polymerizable liquid crystal monomer can be sufficiently cured, and fixed on a substrate.

A temperature in the atmosphere at radiation irradiation (also referred to as irradiation temperature) is not particularly limited, but in order to fix the uniform oriented state, it is preferable that radiation irradiation is performed while maintaining in a range of 30 to 100° C.

A range of a thickness of a composition after oriented and fixed on the substrate (hereinafter, conveniently referred to as optical thin film) in the phase difference film manufactured as described above can be selected depending on a birefringence index (Δn) of the polymerizable liquid crystal monomer, and a designed retardation value, and is usually 1 to 10 μm, further preferably 1.2 to 8 μm, particularly preferably 1.3 to 6 μm, and most preferably 1.5 to 51 μm. When a thickness is 1 to 10 μm, a phase difference film excellent in optical uniformity is obtained.

A light transmittance of the phase difference film relating to the present embodiment is preferably 80% or higher, more preferably 85% or higher, and further preferably 90% or higher at a wavelength of 590 nm.

In the phase difference film relating to the present embodiment, in order to improve display property of a liquid crystal panel, a retardation value Re (590) in a film plane measured with light at a wavelength of 590 nm is preferably constructed so as to satisfy the following equation (1).

$$80 \text{ nm} \leq Re(590) \leq 800 \text{ nm} \tag{1}$$

wherein, Re(590) is (nx−ny)×d, nx means a refractive index in a slow axis direction of a phase difference film (a direction at which a refractive index in a phase difference film plane becomes maximum), ny means a refractive index in a fast axis direction of a phase difference film, and d[nm] means a thickness of a phase difference film.

Particularly, when the phase difference film relating to the embodiment is used as a λ/2 plate (½ wavelength plate), 200 nm<Re (590)≦350 nm is preferable, 240 nm<Re(590)≦300 nm is further preferable, 260 nm<Re(590)≦280 nm is particularly preferable, and 265 nm<Re(590)≦275 nm is most preferable. In addition, when the phase difference film of the present invention is used as a λ/4 plate (¼ wavelength plate), 80 nm<Re(590)≦200 nm is preferable, 120 nm<R(590) ≦160 nm is further preferable, 130 nm<Re(590)≦150 nm is particularly preferable, and 135 nm<Re(590)≦145 nm is most preferable.

A variation in a retardation value Re(590) is preferably within±5.0 nm, and further preferably within±4.0 nm.

Wavelength dispersion property of the phase difference film is preferably such that a $D_1(Re)$ value and a $D_2(Re)$ value calculated by the following equations (2) and (3) are $0.818 \leq D_1(Re) \leq 1.080$, and $0.961 \leq D_2(Re) \leq 1.182$, respectively. A range of $D_1(Re)$ and $D_2(Re)$ values is further preferably $1.000 \leq D_1(Re) \leq 1.080$, and $0.961 \leq D_2(Re) \leq 1.000$, particularly preferably $1.030 \leq D_1(Re) \leq 1.070$, and $0.961 \leq D_2(Re) \leq 0.980$, most preferably $1.060 \leq D_1(Re) \leq 1.070$, and $0.961 \leq D_2(Re) \leq 0.965$. As a value in wavelength dispersion property of such the phase difference film is smaller in the aforementioned range, display property of a liquid crystal panel can be further improved since when used in utility such as a λ/4 plate and a λ/2 plate, wavelength dependency of a retardation value becomes smaller.

$$D_1(Re)=Re(450)/Re(550) \tag{2}$$

$$D_2(Re)=Re(650)/Re(550) \tag{3}$$

wherein, Re(450), Re(550) and Re(650) are retardation values in a film plane for light at a wavelength of 450 nm, 550 nm and 650 nm, respectively.

Second Embodiment

A phase difference film relating to a second embodiment of the present invention is obtained by orienting and fixing, on a substrate, a composition containing a liquid crystalline di(meth)acrylate compound (which is a polymerizable liquid crystal monomer of a particular structure represented by the following formula (III) in which a phenylene group at a main chain central part is substituted with an acetylene group having an aromatic group (hereinafter, referred to as liquid crystal monomer (III)).

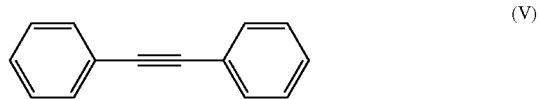

A central part of the liquid crystal monomer (III) has approximately the same structure as that of the tolan skeleton of "an aromatic group bound to a phenylene group-acetylene-lateral position in a main chain", as shown by the following formula (VI) (in the formula (VI), X is the same as X in the aforementioned formula (III)).

When light enters a phase difference film obtained by orienting and fixing a composition containing such the liquid crystal monomer (III) on a substrate, an extraordinary ray is transmitted in a main chain direction and an ordinary ray is transmitted in a lateral position direction. Herein, a lateral position of the liquid crystal monomer (III) is substituted with an acetylene group having an aromatic group, and has approximately the same structure as that of a tolan skeleton (tolan skeleton aspect) together with a phenylene group in a main chain. For this reason, as compared with, for example, the case where a lateral position is not substituted and substituted with a methyl group, since a tolan skeleton aspect is sterically highly bulky and has a great polarizability, it is thought that a refractive index ($n_e$) of an extraordinary ray becomes small and, conversely, a refractive index($n_o$) of an

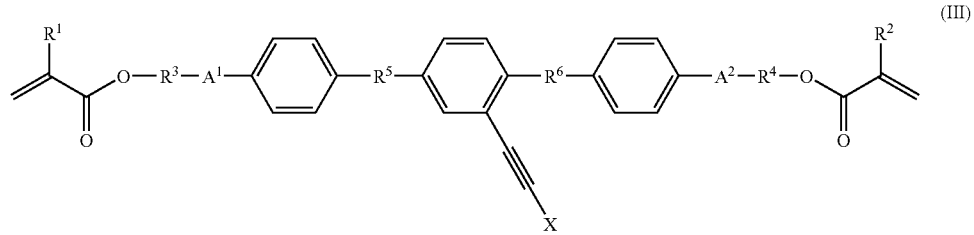

wherein, in the formula (III), $R^1$ and $R^2$ represent each independently a hydrogen atom or a methyl group, $R^3$ and $R^4$ represent each independently an alkylene group of a carbon number of 2 to 12, $R^5$ and $R^6$ represent independently —O—CO— or —CO—O—, $A^1$ and $A^2$ represent each independently —O— or —O—CO—O—, and X represents an aromatic substituent.

Such the liquid crystal monomer (III) has a structure in which an ortho position (lateral position) of a phenylene group at a main chain central part is substituted with an acetylene group having an aromatic group.

Herein, a structure in which both of two hydrogen atoms of acetylene represented by the following formula (V) are substituted with a phenyl group is referred to as tolan skeleton.

ordinary ray becomes great and, as a result, a birefringence index Δn ($=n_e-n_o$) becomes small. In other words, it is thought that, due to a tolan skeleton aspect, an electron cloud by conjugation is present (a part having a high electron density is present), thereby, rate delay of an ordinary ray is generated, and a refractive index for an ordinary ray is changed ($n_e$ becomes increased).

In the formula (III), $R^1$ and $R^2$ represent each independently a hydrogen atom or a methyl group and, from a viewpoint that the liquid crystal monomer (III) is rapidly crosslinked, it is preferable that both of $R^1$ and $R^2$ are hydrogen atoms.

In addition, $R^3$ and $R^4$ represent each independently an alkylene group of a carbon number of 2 to 12 and, from a viewpoint that a width of a liquid crystal temperature range and better orientating property are obtained, it is preferable that both of $R^3$ and $R^4$ are alkylene groups of a carbon number of 2 to 6.

Further, $R^5$ and $R^6$ represent each independently —O—CO— or —CO—O— and, from a viewpoint of stability and a cost of a raw material, it is preferable that both of $R^5$ and $R^6$ are —O—CO—.

X represents an aromatic substituent and, from a viewpoint that the effect of reducing Δn and better orienting property of a liquid crystal monomer are obtained, X is preferably a phenyl group or a naphthyl group which is not substituted or has a substituent (including the case one or two carbon atoms of the substituent are substituted with a nitrogen atom), or a thiophenyl group, a furanyl group or a pyrrolyl group which is not substituted or has a substituent, particularly preferably a phenyl group.

From the forgoing points, in the present invention, among the liquid crystal monomer (III), a monomer in which X is a phenyl group or a naphthyl group which is not substituted or has a substituent (including the case where one or two carbon atoms of the substituent are substituted with a nitrogen atom), or a thiophenyl group, a furanyl group or a pyrrolyl group which is not substituted or has a substituent (hereinafter, referred to as liquid crystal monomer (V)) is preferably used, and a monomer in which X is a phenyl group (hereinafter, referred to as liquid crystal monomer (VI)) can be particularly preferably used.

A process for preparing a liquid crystal monomer (III) is not particularly limited, but for example, the monomer can be obtained by an endo reaction between a monomer represented by the following formula (VII) (hereinafter, referred to as liquid crystal monomer (VII) and phenylacetylene).

thalic acid and phenol (VIII) may be directly reacted using a condensing agent such as DCC (dicyclohexylcarbodiimide).

A birefringence index (Δn) of the polymerizable liquid crystal monomer (liquid crystal monomer (III), liquid crystal monomer (V) or liquid crystal monomer (VI)) at a wavelength of 589 nm is preferably 0.01 to 0.10, further preferably 0.03 to 0.09, particularly preferably 0.04 to 0.09, and most preferably 0.04 to 0.06. When the birefringence index is within the aforementioned range, even in the case where a phase difference film having a small retardation value is manufactured, a phase difference film having better display uniformity can be manufactured. The meaning of a birefringence index (Δn) of the polymerizable liquid crystal monomer, and a method of measuring a refractive index ($n_e$) of an extraordinary ray and a refractive index ($n_o$) of an ordinary ray are the same as those of the first embodiment.

In addition, in the polymerizable liquid crystal monomer, an average refractive index represented by the following formula (IX) can be, for example, about 1.58 to 1.63.

$$(n_e + 2n_o)/3 \tag{IX}$$

Therefore, as compared with a phase difference film using the previous liquid crystal monomer, the present invention has an advantage of that Δn can be made to be small (retardation value variation can be suppressed) while maintaining an equivalent or more average refractive index.

The phase difference film relating to the present embodiment is obtained by orienting and fixing, on a substrate, a composition containing a polymerizable liquid crystal monomer of a particular structure (liquid crystal monomer (III), preferably liquid crystal monomer (V), more preferably liquid crystal monomer (VI)), as described above. To explain

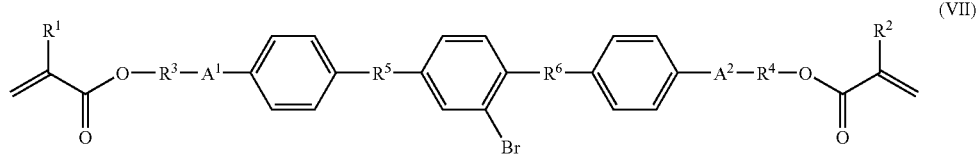

(VII)

wherein, in the formula (VII), $R^1$, $R^2$, $R^3$, $R^4$, $R^5$, $R^6$, $A^1$ and $A^2$ are the same as those shown in the formula (III), respectively.

In addition, the liquid crystal monomer (VII) can be obtained, for example, by an esterification reaction of 1 equivalent of bromoterephthalic acid, and 2 equivalents of a phenolic compound represented by the following formula (VIII) (hereinafter, referred to as phenol (VIII)).

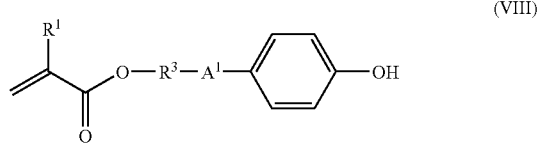

(VIII)

wherein $R^1$, $R^3$ and $A^1$ in the formula (VIII) are the same as those shown in the formula (III), respectively.

In the esterification reaction, an objective product can be simply synthesized by activating the bromoterephthalic acid with acid chloride, phosphorus pentachloride or the like, and reacting this with phenol (VIII). Alternatively, bromoterephthalic acid more specifically, the phase difference film relating to the present embodiment is obtained by coating, on a substrate, a mixed solution of a composition containing the polymerizable liquid crystal monomer and a polymerization initiator, and a solvent, and curing this.

An amount of the polymerizable liquid crystal monomer to be blended is preferably 35 to 99 parts by weight, more preferably 40 to 99 parts by weight, and further preferably 45 to 99 parts by weight relative to 100 parts by weight of a total solid matter of the mixed solution.

The polymerization initiator is used in order to enhance a crosslinking reaction rate and a crosslinking reaction ratio of the polymerizable liquid crystal monomer. A kind of a polymerization initiator is not particularly limited, but a photopolymerization initiator, a water-soluble azo polymerization initiator, an oil-soluble azo polymerization initiator, a polymer azo polymerization initiator, a photocationic initiator, and a radical-based photopolymerization initiator can be used. Preferably, a photopolymerization initiator is used.

The photopolymerization initiator is not particularly limited, but may be a photopolymerization initiator consisting of a single compound, or may be a photopolymerization initiator obtained by mixing two or more kinds of different photopolymerizable initiators. Since examples of the photopolymerization initiator which can be used are the same as those of the first embodiment, detailed explanation thereof will be omitted.

In addition, in order to promote a polymerization reaction, an assistant may be added to the photopolymerization initiator since examples of the assistant which can be used are the same as those of the first embodiment, detailed explanation thereof will be omitted.

Preferable amounts of the polymerization initiator and the assistant to be added are the same as those of the first embodiment.

The solvent is used in order to uniformly disperse or dissolve the polymerizable liquid crystal monomer and the polymerization initiator. Such the solvent is not particularly limited as far as it is excellent in dissolving a composition containing the polymerizable liquid crystal monomer and the polymerization initiator, and does not generate reduction in wettability of a substrate and orienting property of a composition upon coating of the composition on a substrate. Since specific examples of the solvent which can be used are the same as those of the first embodiment, detailed explanation thereof will be omitted.

The solvents may be used alone, or two or more kinds of arbitrary solvents may be used by mixing them in order to enhance smoothness of a phase difference film. Since a preferable total solid matter concentration of the mixed solution is the same as that of the first embodiment, detailed explanation thereof will be omitted.

In addition, when wettability of the mixed solution on the substrate is poor, or when surface uniformity of a phase difference film is worse, in order to improve them, it is possible to add various leveling agents to the mixed solution. Since a kind of a usable leveling agent and a preferable addition amount are the same as those of the first embodiment, detailed explanation thereof will be omitted.

In addition to the polymerizable liquid crystal monomer, the polymerization initiator and the solvent, a polymerizable chiral agent or a vertical orientation treating agent may be added to the mixed solution as in the first embodiment. Such the polymerizable chiral agent and a vertical orientation treating agent are used in order to change the oriented state of a polymerizable liquid crystal monomer. Since a kind of a usable polymerizable chiral agent and vertical orientation treating agent, and a preferable addition amount are the same as those of the first embodiment, detailed explanation thereof will be omitted.

The substrate is used in order to uniformly spread a polymerizable liquid crystal monomer and a polymerization initiator, and, thereafter, obtain the uniform oriented state. Since examples of a material for forming such the substrate are the same as those of the first embodiment, detailed explanation thereof will be omitted.

Since a method of orienting the composition on the substrate, and specific examples of an orientation film are the same as those of the first embodiment, detailed explanation thereof will be omitted.

A method of coating of the mixed solution on a substrate is not particularly limited, but the previously known coating method can be used. Since specific examples of a usable coating method are the same as those of the first embodiment, detailed explanation thereof will be omitted.

A substrate on which the mixed solution has been coated may be subjected to drying treatment, if necessary, before the composition is fixed on a substrate. Preferable drying temperature-drying time are the same as those of the first embodiment.

Examples of a method of fixing the composition include a method by heating, and a method by irradiation with radiation. However, when a method by heating is adopted, since there is a possibility that isotropy phase transition is caused in a polymerizable liquid crystal monomer, and unacceptable orientation is generated, it is preferable to adopt a method by irradiation with radiation. Radiation irradiation is used in order to fix the oriented state of a polymerizable liquid crystal monomer by curing a polymerizable liquid crystal monomer by a crosslinking reaction. A kind of usable radiation, and preferable irradiation condition are the same as those of the first embodiment.

A range of a thickness of a composition (hereinafter, conveniently referred to as optical thin film) after oriented and fixed on the substrate in the phase difference film manufactured as described above can be selected depending on a birefringence index ($\Delta n$) of the polymerizable liquid crystal monomer, and a designed retardation value, and is usually 1 to 10 μm, further preferably 1.2 to 8 μm, particularly preferably 1.3 to 6 μm, and most preferably 1.5 to 5 μm. When a thickness is 1 to 10 μm, a phase difference film excellent in optical uniformity is obtained.

A light transmittance of the phase difference film relating to the present embodiment is preferably 80% or higher, more preferably 85% or higher, and further preferably 90% or higher at a wavelength of 590 nm.

In the phase difference film relating to the present embodiment, in order to improve display property of a liquid crystal panel, it is preferable to construct so that a retardation value Re (590) in a film plane measured with light having a wavelength of 590 nm satisfies the aforementioned equation (1) as in the first embodiment. In particular, when the phase difference film relating to the present embodiment is used as a λ/2 plate (½ wavelength plate), or used as a λ/4 plate (¼ wavelength plate), a preferable range of a retardation value Re (590) is the same as that of the first embodiment. In addition, a preferable range of a variation in a retardation value Re (590) is the same as that of the first embodiment.

As wavelength dispersion property of the phase difference film, a $D_1$ (Re) value and a $D_2$ (Re) value calculated by the equations (2) and (3) described in the first embodiment are preferably $0.818 \leq D_1(Re) \leq 1.080$, and $0.961 \leq D_2(Re) \leq 1.182$, respectively. A range of $D_1(Re)$ and $D_2(Re)$ values is further preferably $1.000 \leq D_1(Re) \leq 1.080$, and $0.965 \leq D_2(Re) \leq 1.000$, particularly preferably $1.010 \leq D_1(Re) \leq 1.070$, and $0.968 \leq D_2(Re) \leq 0.990$, and most preferably $1.030 \leq D_1(Re) \leq 1.040$, and $0.970 \leq D_2(Re) \leq 0.985$. Such the wavelength dispersion property of the phase difference film can further improve display property of a liquid crystal panel since as a value is smaller in the aforementioned range, when used in utility such as a λ/4 plate and a λ/2 plate, wavelength dependency of a retardation values becomes smaller.

The present invention is also provided as an optical film in which the phase difference films relating to the first embodiment or the second embodiment explained above are laminated. An optical film in which the phase difference film of the present invention and other phase difference film are laminated will be mainly exemplified, and explained below.

The optical film of the present invention is such that the aforementioned phase difference film of the present embodiment and other phase difference film are laminated with a pressure-sensitive adhesive, an adhesive or the like. Examples of other phase difference film include a polyester-based resin such as polyethylene terephthalate and polyethylene naphthalate, a cellulose-based resin such as diacetylcellulose and triacetylcellulose, an acryl-based resin such as polymethyl methacrylate, a styrene-based resin such as polystyrene, an acrylonitrile-styrene copolymer, a styrene resin, an acrylonitrile-styrene resin, an acrylonitrile-butadiene-styrene resin, an acrylonitrile-ethylene-styrene resin, a styrene-maleimide copolymer, and a styrene-maleic anhydride copolymer, and a polycarbonate-based resin. Other examples include films obtained by imparting birefringence property to polymer films consisting of a cyclo-based olefin resin, a norbornone-based resin, a polyolefin-based resin such as polyethylene, polypropylene, and an ethylene-propylene copolymer, a vinyl chloride-based resin, an amide-based resin such as nylon and aromatic polyamide, an imide-based resin such as aromatic polyimide and polyimideamide, a sulfone-based resin, a polyethersulfone-based resin, a polyether ether ketone-based resin, a polyphenylene sulfide-based resin, a vinyl alcohol-based resin, a vinylidene chloride-based resin, a vinyl butyral-based resin, an arylate-based resin, a polyoxymethylene-based resin, an epoxy-based resin, or a blend of the aforementioned resins, and films obtained by coating a mixed solution containing a liquid crystalline compound on a substrate, and drying and curing this. Birefringence property is spontaneously generated at making the polymer film, or may be imparted by uniaxially or biaxially stretching the polymer film.

Birefringence property of the other phase difference film is not particularly limited, but for example, when used in a liquid crystal display device of IPS mode, VA mode or OCB mode, a monoaxial phase difference film of Re (590)=80 to 140 nm (Rth(590)/Re(590)=0.9 to 1.3), in addition to a negative monoaxial phase difference film of Re (590)=0 to 5 nm, and Rth (590)=90 to 400 nm, a monoaxial inclined orientation phase difference film in which an optical axis is inclined from a normal line of a substrate by 10 to 80°, a biaxial phase difference film of Re (590)=30 to 60 nm (Rth(590)/Re(590)= 2.0 to 6.0), a biaxial phase difference film of Re (590)=100 to 300 nm (Rth (590)/Re (590)=0.2 to 0.8), and a hybrid orientation phase difference film in which a discotic liquid crystal molecule or a bar-like liquid crystal molecule is gradually inclined relative to a normal line of a substrate are preferably used. The Rth (590) means a retardation value in a film thickness direction for light at a wavelength of 590 nm.

By using (laminating) the monoaxial phase difference film and the biaxial phase difference film with the phase difference film relating to the present invention, further improvement in visual field angle property of a liquid crystal display device can be expected. As the optical film relating to the present invention, a film in which two or more phase difference films relating to the present invention are laminated at an arbitrary angle may be used, or a combination of lamination of two or more phase difference films relating to the present invention, and other phase different films may be used.

In addition, the present invention is also provided as a polarizing plate in which the aforementioned phase difference film or optical film relating to the first embodiment or the second embodiment is disposed at least on one side of a polarizer.

The polarizing plate relating to the present invention can be obtained by laminating the aforementioned phase difference film or optical film with a polarizer (or a polarizing plate) using an adhesive, a pressure-sensitive adhesive or the like. A polarizing plate is usually disposed on both sides of a liquid crystal cell and so that absorption axes of respective polarizing plates are generally crossed at a right angle. In addition, in a polarizing plate, usually, a transparent protecting film is provided on one side or both sides of a polarizer. When a transparent protecting film is provided on both sides of a polarizer, respective transparent protecting films may be formed of the same material, or may be formed of different materials.

The polarizer is not particularly limited, but various polarizers can be used. Examples of the polarizer include polarizers obtained by adsorbing iodine or a dichromic substance such as a dichromic dye onto a hydrophilic polymer film such as a polyvinyl alcohol-based film, a partially formalized polyvinyl alcohol-based film, and an ethylene-vinyl acetate copolymer-based partially saponified film, and uniaxially stretching the film, and polarizers of polyene-based oriented films such as dehydrated polyvinyl alcohol, and polyvinyl chloride which has been subjected to hydrochloric acid removing treatment. Among them, from a viewpoint that a polarization dichromic ratio is high, a polarizer comprising a polyvinyl alcohol-based film and a dichromic substance such as iodine is preferably used. A thickness of a polarizer is not particularly limited, but is generally about 5 to 80 μm.

A polarizer obtained by adsorbing iodine onto a polyvinyl alcohol-based film, and uniaxially stretching this can be prepared, for example, by staining a polyvinyl alcohol-based film by immersing the film in an aqueous solution of iodine, and stretching the film to 3 to 7-fold of an original length. If necessary, the film may be immersed in an aqueous solution of potassium iodide containing boric acid, zinc sulfate, zinc chloride or the like. Further, if necessary, a polyvinyl alcohol-based film may be washed with water by immersing the film in water, before staining.

By washing a polyvinyl alcohol-based film with water, stain on a surface of a polyvinyl alcohol-based film and a blocking preventing agent can be washed and, additionally, there is the effect of preventing ununiform staining by swelling a polyvinyl alcohol-based film. Stretching may be performed after staining with iodine, or stretching may be performed while staining. Alternatively, after stretching, staining may be performed with iodine. Stretching may be performed in an aqueous solution of boric acid, potassium iodide or the like, or in a water bath.

As a transparent protecting film provided on one side or both sides of the polarizer, films excellent in transparency, mechanical strength, heat stability, moisture shielding property, and stability in a retardation value are preferable. Examples of a material for forming such the transparent protecting film include a polyester-based resin such as polyethylene terephthalate and polyethylene naphthalate, a cellulose-based resin such as diacetylcellulose and triacetylcellulose, an acryl-based resin such as polymethyl methacrylate, a styrene-based resin such as polystyrene, an acrylonitrile-styrene copolymer, a styrene resin, an acrylonitrile-styrene resin, an acrylonitrile-butadiene-styrene resin, an acrylonitrile-ethylene-styrene resin, a styrene-maleimide copolymer, and a styrene-maleic anhydride copolymer, and a polycarbonate-based resin. Alternatively, a cyclo-based olefin resin, a norbornene-based resin, a polyolefin-based resin such as polyethylene, polypropylene, and an ethylene-propylene copolymer, a vinyl chloride-based resin, an amide-based resin such as nylon and an aromatic polyamide, an imide-based resin such as aromatic polyimide and polyimideamide, a sulfone-based resin, a polyether sulfone-based resin, a polyether ether ketone-based resin, a polyphenylene sulfide-based resin, a vinyl alcohol-based resin, a vinylydene chloride-based resin, a vinylbutyral-based resin, an arylate-based resin, a polyoxymethylene-based resin, and an epoxy-based resin may be used. Additional examples of a resin for forming the transparent protecting film include polymer films comprising a blend of the aforementioned resins. The transparent protecting film may be formed as a cured layer of a thermally curing-type or ultraviolet-ray curing-type resin such as an acryl series, a urethane series, an acrylurethane series, an epoxy series, and a silicone series.

Alternatively, a resin composition containing (A) a thermoplastic resin having a substituted and/or unsubtituted imide group on a side chain, and (B) a thermoplastic resin having a substituted and/or unsubstituted phenyl and nitrile group on a side chain described in JP-A No. 2001-343529 may be used. Specific examples include polymer films containing an alternate copolymer consisting of isobutylene and N-methylmaleimide, and an acrylonitrile-styrene copolymer.

From a viewpoint of polarizing property and durability, it is preferable to use a cellulose-based resin such as triactylcellulose or a norbornene-based resin as the transparent protecting film. Specific examples include trade name "Fujitack" manufactured by Fuji Photo Film Co., Ltd. trade name "Zeonor" manufactured by Zeon Corporation, and trade name "Arton" manufactured by JSR.

A thickness of the transparent protecting film can be appropriately determined, and generally, from a viewpoint of a strength, workability such as handling property, and thin layer property, the thickness is preferably about 1 to 500 μm, more preferably 5 to 200 μm, and particularly preferably 10 to 150 μm. When the thickness is within the aforementioned range, a polarizer can be mechanically protected and, even when exposed to high temperature and high humidity, a polarizer is not shrunk, and stable optical property can be retained.

A retardation value in a film plane and a retardation value in a thickness direction may influence on visual field angle property of a liquid crystal display device in some cases, it is therefore preferable to use the transparent protecting film in which a retardation value is optimized. However, a transparent protecting film for which optimization of a retardation value is desired is a transparent protecting film which is laminated on a surface of a polarizer on a side near a liquid crystal cell, and a transparent protecting film which is laminated on a surface of a polarizer on a side far from a liquid crystal cell does not change optical property of a liquid crystal display device, therefore, the aforementioned influence is not true in this case.

A retardation value of the transparent protecting film is preferably such that a retardation value Re (590) in a film plane is preferably 0 to 10 nm, more preferably 0 to 5 nm, and further preferably 0 to 1 nm. In addition, a retardation value Rth (590) in a film thickness direction is preferably 0 nm to 200 nm, more preferably 0 to 60 nm, and further preferably 0 nm to 30 nm.

A method of laminating the transparent protecting film with a polarizer is not particularly limited, but for example, they can be laminated via an adhesive comprising an acryl-based polymer or a vinyl alcohol-based polymer, or an adhesive at least consisting of a water-soluble crosslinking agent for a vinyl alcohol-based polymer such as boric acid, borax, glutaraldehydemelamine and oxalic acid. Therefore, a laminate which is peeled due to influence of a humidity or heat with difficulty, and is excellent in a light transmittance and a polarizing degree can be obtained. It is preferable to use, as the adhesive, a polyvinyl alcohol-based adhesive in that it is excellent in adherability with polyvinyl alcohol which is a raw material for a polarizer.

As a pressure-sensitive adhesive when a polymer film containing the norbornene-based resin as a transparent protecting film is laminated with a polarizer, pressure-sensitive adhesives which are excellent in transparency, are small in birefringence, and can exert a sufficient adhering force even when used as a thin layer, are preferable. As such the pressure-sensitive adhesive, for example, a dry laminating adhesive obtained by mixing a polyurethane-based resin solution and a polyisocyanate resin solution, a styrene butadiene rubber-based adhesive, and an epoxy-based two-pack type adhesive (comprising two liquids of an epoxy resin and polythiol, or comprising two liquids of an epoxy resin an polyamide) can be used. Particularly, a solvent-type adhesive and an epoxy-based two-pack curing-type adhesive which are transparent are preferable. Some adhesives can improve an adhering force by using a suitable adhesion undercoating agent and, when these adhesives are used, it is preferable to use an adhesion undercoating agent.

The adhesion undercoating agent is not particularly limited as far as it can improve adherability, but for example, a so-called coupling agent such as a silane-based coupling agent having a reactive functional group such as an amino group, a vinyl group, an epoxy group, a mercapto group, and a chloro group, and a hydrolysable alkoxysilyl group in the same molecule, a titanate-based coupling agent having a hydrolysable hydrophilic group containing titanium, and an organic functional group in the same molecule, and an aluminate-based coupling agent having a hydrolysable hydrophilic group containing aluminum, and an organic functional group in the same molecule, and resins having an organic reactive group such as an epoxy-based resin, an isocyanate-based resin, a urethane-based resin, and an esterurethane-based resin can be used. Among them, from a viewpoint of easy industrial handling, agents containing a silane-based coupling agent are preferable.

In order to make lamination on a liquid crystal cell easy, it is preferable to provide a layer of an adhesive or a pressure-sensitive adhesive on one side or both sides of the polarizing plate relating to the present invention.

The adhesive or pressure-sensitive adhesive is not particularly limited, but those containing, as a base polymer, polymers such as an acryl-based polymer, a silicone-based polymer, polyester, polyurethane, polyamide, polyvinyl ether, vinyl acetate/vinyl chloride copolymer, modified polyolefin, epoxy series, fluorine series, and rubber series such as natural rubber and synthetic rubber can be used by appropriate selection. In particular, an acryl-based pressure-sensitive adhesive is preferably used in that it is excellent in optical transparency, exhibits adhering property such as suitable wettability, aggregating property, and adherability, and excellent in weather resistance and heat resistance.

The adhesive or pressure-sensitive adhesive may contain a crosslinking agent depending on a base polymer. In addition, if necessary, a suitable additive such as natural or synthetic resins, a glass fiber or glass beads, a filler comprising a metal powder or other inorganic powder, a pigment, a coloring agent, and an antioxidant may be blended in the pressure-sensitive adhesive. Alternatively, by inclusion of transparent fine particles, a pressure-sensitive adhesive layer exhibiting light diffusivity may be obtained.

As the transparent fine particles, one or two or more kinds of suitable fine particles such as inorganic fine particles which may have electric conductivity such as silica, calcium oxide, alumina, titania, zirconia, tin oxide, indium oxide, cadmium oxide, and antimony oxide, and crosslinked or uncrosslinked organic fine particles comprising a suitable polymer such as polymethyl methacrylate and polyurethane, which have an average particle diameter of 0.5 to 20 μm, can be used.

The adhesive or pressure-sensitive adhesive is usually used as an adhesive solution having a solid matter concentration of about 10 to 50% by weight in which a base polymer or a composition thereof is dissolved or dispersed in a solvent. As the solvent, an organic solvent such as toluene and ethyl acetate, and water can be appropriately selected and used depending on a kind of an adhesive.

The adhesive or pressure-sensitive adhesive may be provided on one side or both sides of a polarizing plate as a laminate of adhesives having different compositions or kinds. A thickness of the adhesive or pressure-sensitive adhesive can be appropriately determined depending on the use purpose and an adhering force, and is generally 1 to 500 µm, preferably 5 to 200 µm, and particularly preferably 10 to 100 µm.

For the purpose of preventing pollution, an exposed surface of the adhesive layer or pressure-sensitive adhesive layer is preferably protected for a time until practical use by provisionally adhering a peeling paper or a releasing film (also referred to as separator). Thereby, in the conventional handling state, contact with an adhesive layer or a pressure-sensitive adhesive layer can be prevented. As the separator, appropriate separators according to the previous ones, appropriate thin entities such as a plastic film, a rubber sheet, a paper, a cloth, a non-woven fabric, a net, an expanded sheet, a metal foil, or a laminate thereof, which is coating-treated with an appropriate peeling agent such as silicone series, long chain alkyl series, fluorine series, and molybdenum sulfide if necessary can be used.

A side of the transparent protecting film on which a polarizer is not adhered may be subjected to hard coating treatment, reflection preventing treatment, sticking preventing treatment, or diffusion treatment (also referred to as anti-glare treatment). The hard coating treatment is performed for the purpose of preventing flaw on a polarizing plate surface, and a cured film excellent in a hardness and sliding property with an appropriate ultraviolet-ray curing-type resin such as an acryl series, and a silicone series is formed on a surface of the transparent protecting film. The reflection preventing treatment is performed for the purpose of preventing reflection of natural light on a polarizing plate surface. In addition, the sticking preventing treatment is performed for the purpose of preventing tight adhesion with an adjacent layer. The anti-glare treatment is performed for the purpose of preventing inhibition of visibility of polarizing plate-transmitted light by reflection of natural light on a surface of a polarizing plate. For example, a fine irregular structure (anti-glare layer) is imparted to a surface of a transparent protecting film by an appropriate format such as a roughening format by sand blast or embossing procession and a format of blending transparent fine particles. In addition, the anti-glare layer may function also as a diffusion layer for diffusing polarizing plate-transmitted light to expand a visible angle (visible angle expanding function etc.).

Then, other optical member which can be used with the phase difference film, the optical film or the polarizing plate relating to the present invention will be explained.

Other optical member is not particularly limited, but examples include optical films which have been separately subjected to the aforementioned hard coating treatment, reflection preventing treatment, sticking preventing treatment, or diffusion treatment (also referred to as anti-glare treatment). Additional examples include a reflection-type polarizing plate and a semipermeable-type polarizing plate in which a reflecting plate or a semipermeable reflecting plate is further laminated on an elliptically polarizing plate or a circularly polarizing plate. Alternatively, a reflection-type elliptically polarizing plate or a semipermeable-type elliptically polarizing plate obtained by combining the reflection-type polarizing plate or the semipermeable-type polarizing plate and a phase difference film may be used. When the phase difference film, the optical film or the polarizing plate relating to the present embodiment is used in a permeable-type or semi-permeable-type liquid crystal display device, a liquid crystal display device having high display property can be obtained by using together with a commercially available luminance-improving film (a polarizing separation film having polarization selecting layer, such as D-BEF manufactured by Sumitomo 3M).

Although the optical film or the polarizing plate relating to the present embodiment may be formed, for example, by successively and separately laminating in a step of manufacturing a liquid crystal display device, pre-lamination is preferable because stability in quality and laminating workability are excellent, and an efficiency of manufacturing a liquid crystal display device can be improved.

The above-explained phase difference film, optical film and polarizing plate relating to the present invention, as well as a liquid crystal panel provided with them and a liquid crystal cell can be suitably used in a liquid crystal display device, an organic electroluminescence (organic EL display) or the like.

A kind of the liquid crystal display device is not particularly limited, but the present invention can be used in any kind of permeable-type, reflection-type and reflection-semipermeable-type. Examples of a liquid crystal cell used in the liquid crystal display device include various liquid crystal cells such as twisted nematic (TN) mode, supertwisted nematic (STN) mode, horizontal orientation (ECB) mode, vertical orientation (VA) mode, in-plane switching (IPS) mode, bend nematic (OCB) mode, ferroelectric liquid crystal (SSFLC) mode, and anti-ferroelectric liquid crystal (AFLC) mode liquid crystal cells. Among them, the phase difference film, the optical film and the polarizing plate relating to the present invention are preferably used, particularly, in TN mode, VA mode, IPS mode and OCB mode liquid crystal cells.

The twisted nematic (TN) mode liquid crystal cell refers to a liquid crystal cell in which a positive dielectric anisotropic nematic liquid crystal is held between two substrates, and liquid crystal molecule orientation is twisted by 90 degrees by surface orientation treatment of a glass substrate. Specifically, examples include a liquid crystal cell described in "Liquid Crystal Dictionary", Baifukan Co., Ltd., p 158 (1989), and a liquid crystal cell described in JP-A No. 63-279229.

The vertical orientation (VA) mode liquid crystal cell refers to a liquid crystal cell in which a nematic liquid crystal having negative dielectric anisotropy is vertically arranged between transparent electrodes when a voltage is not applied, utilizing electrically controlled birefringnence (ECB) effect. Specific examples include a liquid crystal cell described in JP-A No. 62-210423 and JP-A No. 4-153621. Alternatively, the VA mode liquid crystal cell may be a MVA mode liquid crystal cell in which a slit is provided in a pixel in order to expand a visible field angle, or a cell is multidomainated by using a substrate having a surface with protrusion formed thereon as described in JP-A No. 11-258605. Further, the VA mode liquid crystal cell may be a VATN mode liquid crystal cell in which a chiral agent is added to a liquid crystal to substantially vertically orient a liquid crystal when a nematic liquid crystal voltage is not applied, thereby, a cell is twisted multidomain oriented when a voltage is applied, described in JP-A No. 10-123576.

The in-plane switching (IPS) mode liquid crystal cell refers to a liquid crystal cell in which, in a so-called sandwich cell with a liquid cell sealed between two parallel substrates, a nematic liquid crystal homogeneously oriented in the absence of the electric field is made to respond to the electric field parallel with a substrate (also referred to as transverse electric field), utilizing electrically controlled birefringnence (ECB) effect. Specifically, the IPS mode liquid crystal cell refers to a liquid crystal cell in which, when a long axis of a liquid crystal molecule is consistent with a polarizing axis of an incident side polarizing plate to arrange upper and lower polarizing plates orthogonally, complete black display is realized in the absence of the electric field, and a transmittance depending on a rotation angle can be obtained by rotating a liquid crystal molecule while a liquid crystal molecule is parallel with a substrate, in the presence of the electric field, as described in "Monthly Display No. July" published by Techno Times Co., Ltd., p. 83-88 (1997 edition), and "Liquid Crystal, vol. 2, No. 4" published by Japan Liquid Crystal Society, p. 303-316 (1998 edition).

The bend nematic (OCB: Optically Compensated Bend or Optically Compensated Birefringnence) mode liquid crystal cell refers to a liquid crystal cell in which a nematic liquid crystal having positive dielectric anisotropy is bend-oriented between transparent electrodes, and twisted orientation is present at a central part when a voltage is not applied, utilizing electrically controlled birefringnence (ECB) effect. The OCB mode liquid crystal cell is also referred to as "π cell". Specifically, examples include a liquid crystal cell described in "Next Generation Liquid Crystal Display" published by Kyoritsu Shuppan Co., Ltd. (2000), p 11-27, and a liquid crystal cell described in JP-A No. 7-084254.

By using the phase difference film, the optical film or the polarizing plate relating to the present invention in such various liquid crystal cells, contrast, hue and visual field angle properties can be improved and, moreover, the function can be maintained for a long period of time.

The present invention will be explained in more detail below by way of Examples and Comparative Examples, but the present invention is not limited to these Examples.

Measuring Conditions of Respective Properties are as follows:

(1) Liquid Crystal Temperature Range

A liquid crystal temperature range was measured by observation at a temperature raising and lowering rate of 10° C./min using a polarization microscope (OLYMPUS BX50) equipped with a hot stage (METTLER TOLEDO FP82HT). To explain more specifically, a lower limit of a liquid crystal temperature range was determined by a crystal phase-liquid crystal phase transition temperature (Tm), an upper limit was determined by a liquid crystal phase-isotropic phase transition temperature (Ti), and the temperature range was measured by arranging a liquid crystal compound held by two glass slides on the hot stage, and observing this with the polarization microscope (two polarizers are crossed nicols-arranged) while a temperature was raising and lowering. A crystal phase-liquid crystal phase transition temperature (Tm) is a temperature at which a crystal of a liquid crystal is melted (becomes flowing) under observation with a polarization microscope, and a liquid crystal phase-isotropic phase transition temperature (Ti) is a temperature at which the light visible field is converted into the dark visual field.

(2) Refractive Index Difference Δn and Average Refractive Index

Δn and an average refractive index were calculated based on a refractive index measured at room temperature with light of a wavelength 589 nm using an Abbe refractometer.

(3) In-Plane Retardation Value and Wavelength Dispersion Property

An in-plane retardation value was measured at a wavelength of 590 nm under room temperature using a spectroellipsometer (M-220, manufactured by JASCO Corporation). In addition, wavelength dispersion property was calculated by measuring an in-plane retardation value at a wavelength of 450 nm, 550 nm and 650 nm, respectively, under room temperature using the spectroellipsometer.

(4) Light Transmittance

A light transmittance was measured using a ultraviolet and visible spectrophotometer (V-560, manufactured by JASCO Corporation).

PREPARATION EXAMPLE 1

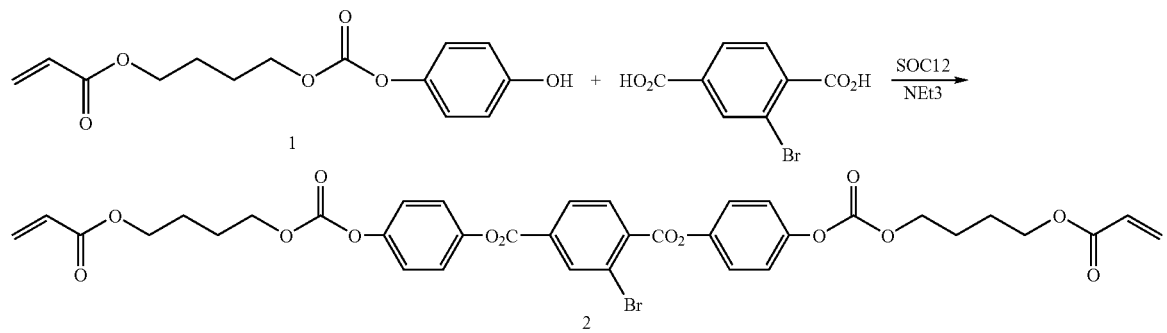

Two droplets of N,N-dimethylformamide were added to a mixture of bromoterephthalic acid (2.55 g, 10.4 mmol) and thionyl chloride (12.4 g, 104.2 mmol), and the mixture was stirred at 70° C. for 2 hours under nitrogen. After excessive thionyl chloride was removed under reduced pressure, dichloromethane (10 ml), a phenolic compound represented by the above chemical structural formula 1 (6.42 g, 22.9 mmol) and a small amount of BHT were added. A reactor was immersed in a water bath, 4.4 ml (31.3 mmol) of triethylamine was slowly added and, thereafter, the mixture was stirred at 40° C. for 2 hours. After completion of the reaction, 1N hydrochloric acid was added, and this was extracted with dichloromethane. The organic layer was washed with an aqueous saturated sodium chloride solution, and dried with magnesium sulfate. This was passed through a short column of "Florisil 75 to 150 μm (100 to 200 mesh)" manufactured by Wako Pure Chemical Industries, Ltd., the solvent was removed by evaporation, and this was recrystallized from isopropyl alcohol to obtain 3.5 g (44%) of a compound represented by the above chemical structural formula 2.

Spectral data of the compound represented by the above chemical structural formula 2 are shown below.

Herein, $^1$H-NMR was measured as follows: a small amount of sample was measured using (LA400) manufactured by JEOL. Ltd. under the conditions of an observation nucleus: 1H, a frequency: 400 MHz, a pulse width: 45 degrees, a pulse repetition time: 10 seconds, a standard of chemical shift: 7.25 ppm, a measuring solvent: heavy chloroform, and a measuring temperature: room temperature. $^{13}$C-NMR was measured under the same condition as that of measurement of $^1$H-NMR except that an observation nucleus: 13C, and a frequency: 100 MHz were used. Further, for measuring IR, a KBr method was used. To more specifically explain, a small amount of a sample, and dry KBr were ground and mixed with an agate mortar, and the mixture was compression-molded into a thin film. Using the thin film-like sample, absorption at an infrared region of 600 to 4000 cm$^{-1}$ was measured at room temperature.

<Regarding $^1$H-NMR>

$^1$H-NMR (400 MHz, CDCl$_3$): δ 1.85-1.98 (m, 8H), 4.29 (t, 4H, J=6.1 Hz), 4.37 (t, 4H, J=6.1 Hz), 5.90 (dd, 2H, J=1.5, 10.5 Hz), 6.19 (dd, 2H, J=10.5, 17.4 Hz), 6.48 (dd, 2H, J=1.5, 17.4 Hz), 7.29-7.41 (m, 8H), 8.13 (d, 1H, J=8.0 Hz), 8.29 (dd, 1H, J=1.5, 8.0 Hz), 8.58 (d, 1H, J=1.5 Hz)

<Regarding $^{13}$C-NMR>

$^{13}$C-NMR(100 MHz, CDCl$_3$): δ 25.1, 25.4, 63.8, 68.4, 122.2, 122.4, 128.4, 128.8, 130.8, 131.6, 133.5, 135.89, 135.93, 147.9, 148.0, 148.89, 148.92, 153.5, 162.8, 163.8, 166.2

<Regarding IR>

IR (KBr, cm$^{-1}$): 2953, 1761, 1746, 1719, 1505, 1192

A liquid crystal temperature range was as follows:

Liquid crystal temperature range (at temperature rising): 86 to 101° C.

Liquid crystal temperature range (at temperature lowering): 97 to 35° C.

EXAMPLE 1

A PVA oriented film was formed on a high refractive glass plate by spin-coating a 5 weight (wt) % aqueous polyvinyl alcohol solution on a high refractive glass plate at 2000 rpm for 10 seconds and heating at 150° C. for 1 hour. A surface of such the oriented film was rubbing-treated, and a liquid crystal composition solution obtained by dissolving 100 parts by weight of the compound of the chemical structural formula 2 obtained in Preparation Example 1, 3 parts by weight of a photopolymerization initiator Irgacure 907 (manufactured by Ciba Specialty Chemicals) and 0.05 parts by weight of an acrylic acid copolymer-based leveling agent ("BYK361" manufactured by Big Chemie) in 200 parts by weight of cyclopentanone was coated by a spin-coating method to form a thin film. This thin film was dried for 1 minute in an air circulation constant temperature bath retained at 90° C.±1° C., and a horizontally oriented nematic monodomain phase was formed. Further, using a ultraviolet-ray irradiating apparatus using a metal halide lamp as a light source, ultraviolet-ray of 600 mJ/cm$^2$ was irradiated from a side of coating of a liquid crystal composition solution under the air atmosphere to perform photopolymerization, and the oriented state was fixed. A refractive index of the thus prepared optical thin film (a liquid crystal composition after orientation and fixation; corresponding to a part except for a high refractive glass plate and a PVA oriented film in the present Example) was measured with an Abbe refractometer, and n$_e$ was 1.632, no was 1.545, and Δn was 0.087. In addition, wavelength dispersion property was measured using a spectroellipsometer, and D$_1$(Re) was Re (450)/Re (550)=1.065, and D$_2$ (Re) was Re (650)/Re (550)=0.962.

EXAMPLE 2

The liquid crystal composition solution used in Example 1 was coated on a stretched PET film immobilized on a glass plate by a bar coating method to form a thin film. This thin film was dried for 1 minute in an air circulation constant temperature bath retained at 90° C.±1° C., and a horizontally oriented nematic monodomain phase was formed. Further, ultraviolet-ray of 600 mJ/cm$^2$ was irradiated from a side of coating of a liquid crystal composition solution under the air atmosphere using a ultraviolet-ray irradiating apparatus using a metal halide lamp as a light source to perform photopolymerization, and the oriented state was fixed. This optical thin film (a liquid crystal composition after orientation and fixation; corresponding to a part except for a glass plate and a stretched PET film in the present Example; its average thickness was 1.61 μm) was transferred onto a glass plate to prepare a 10 cm×10 cm sample. A retardation value Re (590) of in-plane nine places (see symbol 1 in the figure) at an equal interval was measured with a spectroellipsometer as shown in FIG. 1, and an average retardation value was 139.7 nm, and a retardation value variation was ±3.9 nm. In addition, a light transmittance at a wavelength of 590 nm measured with a ultraviolet and visible spectrophotometer was 92%.

COMPARATIVE EXAMPLE 1

Using the same procedure as that of Example 2, an optical thin film of a polymerizable nematic liquid crystal monomer (trade name: LC242, manufactured by BASF in the Federal Republic of Germany) (n$_e$=1.654, n$_o$=1.523, Δn=0.131) was prepared. The resulting optical thin film (average thickness 1.09 μm) was transferred onto a glass plate to prepare a 10 cm×10 cm sample, a retardation value Re (590) at in-plane nine places at an equal interval was measured with a spectroellipsometer as shown in FIG. 1, and an average retardation value was 141.2 nm, and a retardation value variation was ±6.8 nm. In addition, wavelength dispersion property was measured, and D$_1$ (Re) was Re (450)/Re (550)=1.082, and D$_2$ (Re) was Re (650)/Re (550)=0.960.

Like this, in a liquid crystal monomer of Example 1, Δn was 0.087 which is a smaller value than the previous LC242 (Δn=0.131). In addition, in the phase difference film of Example 2 prepared using the liquid crystal monomer of Example 1, transparency is excellent as a light transmittance being 92% and, at the same time, even when a thickness of a phase difference film (thickness of optical thin film) was small as 1.61 μm, since a liquid crystal monomer having Δn of 0.087 smaller than previous Δn is used, a variation in a retardation value of a phase difference film (=Δn×thickness) becomes small. Therefore, a phase difference film by which coating at a desired small thickness is easy and which is excellent in productivity can be obtained without requiring to have an extremely high coating precision.

PREPARATION EXAMPLE 2

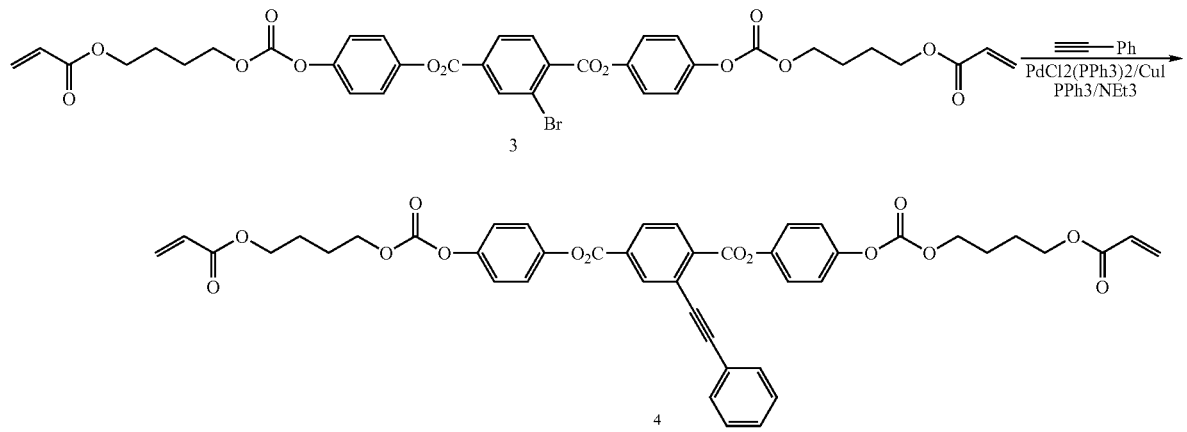

Triethylamine (1.82 ml) was added to a THF solution (10 ml) containing a monomer represented by the chemical structural formula 3 (5.00 g, 6.52 mmol), phenylacetylene (0.80 g, 7.83 mmol), PdCl$_2$(PPh$_3$)$_2$ (0.23 g, 0.33 mmol), triphenylphosphine (0.34 g, 1.31 mmol), copper (I) iodide (0.25 g, 1.31 mmol), and a minor amount of BHT as a polymerization inhibitor, and the mixture was stirred at 80° C. for 12 hours. After completion of the reaction, 1N hydrochloric acid was added, and this was extracted with dichloromethane. The organic layer was washed with an aqueous saturated sodium chloride solution, and dried with magnesium sulfate. This was passed through a short column of "Florisil 75 to 150 μm (100 to 200 mesh)" manufactured by Wako Pure Chemical Industries, Ltd., the solvent was removed by evaporation, and this was recrystallized from isopropyl alcohol to obtain 3.32 g (64%) of the compound represented by the chemical structural formula 4.

A liquid crystal temperature range was as follows:

Liquid crystal temperature range (at temperature rising): melting point 95° C.

Liquid crystal temperature range (at temperature lowering): 51 to 35° C.

Spectral data of the compound represented by the chemical structural formula 4 are shown below.

Herein, $^1$H-NMR was measured as follows: a small amount of a sample was measured using LA400 manufactured by JEOL. Ltd. under the conditions of an observation nucleus: 1H, a frequency: 400 MHz, a pulse width: 45 degrees, a pulse repetition time: 10 seconds, a standard of chemical shift: 7.25 ppm, a measuring solvent: heavy chloroform, and a measuring temperature: room temperature. In addition, $^{13}$C-NMR was measured under the same condition as that of measurement of $^1$H-NMR except that an observation nucleus was 13 C, and a frequency was 100 MHz. Further, for measuring IR, a KBr method was used. To explain more specifically, a small amount of a sample and dry KBr were ground and mixed with an agate mortar, and the mixture was compression-molded into a thin film. Using the thin film-like sample, absorption at an infrared region of 600 to 4000 cm$^1$ was measured at room temperature.

<Regarding $^1$H-NMR>

$^1$H-NMR(400 MHz, CDCl$_3$): δ 1.77-1.89(m, 8H), 4.20(t, 4H, J=6.0 Hz), 4.26-4.32 (m, 4H), 5.81 (dd, 2H, J=1.5, 10.3 Hz), 6.10 (dd, 2H, J=10.3, 17.3 Hz), 6.39(dd, 2H, J=1.5, 17.3 Hz), 7.20-7.45(m, 11H), 7.48-7.51 (m, 2H), 8.17 (dd, 1H, J=1.5, 8.3 Hz), 8.23 (d, 1H, J=8.3 Hz), 8.49 (d, 1H, J=1.5 Hz)

<Regarding $^{13}$C-NMR>

$^{13}$C-NMR(100 MHz, CDCl$_3$): δ 25.1, 25.4, 63.9, 68.4, 87.0, 96.6, 122.17, 122.19, 122.5, 122.6, 125.1, 128.4, 128.5, 129.1, 130.9, 131.3, 131.9, 132.8, 135.0, 135.7, 148.1, 148.2, 148.8, 148.9, 153.5, 163.5, 163.8, 166.2

<Regarding IR>

IR (KBr, cm$^{-1}$): 2961, 2142, 1765, 1726, 1507, 1184

EXAMPLE 3

A 5 weight (wt) % aqueous polyvinyl alcohol solution was spin-coated on a high refractive glass plate at 2000 rpm for 10 seconds, and heated at 150° C. for 1 hour to form a PVA oriented film on a high refractive glass plate. A surface of such the oriented film was rubbing-treated, and a liquid crystal composition solution obtained by dissolving 100 parts by weight of the compound of the chemical structural formula 2 obtained in Preparation Example 1, 3 parts by weight of a photopolymerization initiator Irgacure 907 (manufactured by Ciba Specialty Chemicals) and 0.05 parts by weight of an acrylic acid copolymer-based leveling agent ("BYK361" manufactured by Big Chemie) in 200 parts by weight of cyclopentanone was coated by a spin coating method to form a thin film. This thin film was dried for 1 minute in an air circulation constant temperature bath retained at 90° C.±1° C., and allowed to cool at room temperature to form a horizontally oriented nematic monodomain phase. Further, using a ultraviolet-ray irradiating apparatus using a metal halide lamp as a light source, ultraviolet-ray of 600 mJ/cm$^2$ was irradiated from a side of coating of a liquid crystal composition solution under the air atmosphere to perform photopolymerization, and the oriented state was fixed. A refractive index of the thus prepared optical thin film (a liquid crystal composition after orientation and fixation; corresponding to a part except for a high refractive glass plate and a PVA oriented film in the present Example) was measured with an Abbe refractometer, and $n_e$ was 1.631, $n_o$ was 1.585, and Δn was 0.046. In addition, wavelength dispersion property was measured using a spectroellipsometer, and D$_1$ (Re) was Re (450)/Re (550)=1.035, and D$_2$ (Re) was Re (650)/Re (550)=0.979.

PREPARATION EXAMPLE 3

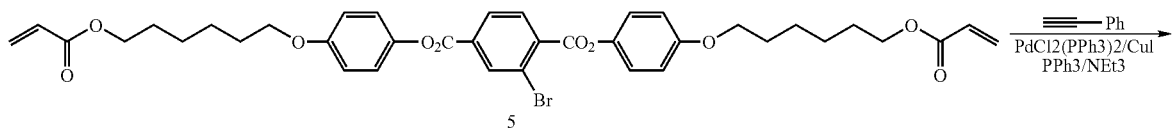

5

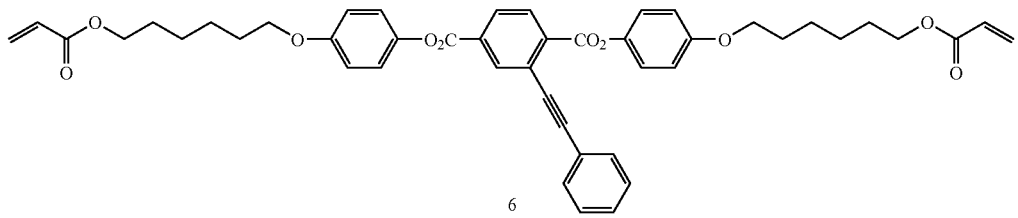

6

Triethylamine (0.5 ml) was added to a THF solution (5 ml) containing the monomer represented by the chemical structural formula 5 (1.0 g, 1.36 mmol), phenylacetylene (1.17 g, 1.63 mmol), $PdCl_2(PPh_3)_2$ (47.6 mg, 67.8 μmol), triphenylphosphine (71.1 mg, 0.27 mmol), copper (I) iodide (51.6 mg, 0.27 mmol), and a minor amount of BHT as a polymerization inhibitor, and the mixture was stirred at 80° C. for 12 hours. After completion of the reaction, 1N hydrochloric acid was added, and this was extracted with dichloromethane. The organic layer was washed with an aqueous saturated sodium chloride solution, and dried with magnesium sulfate. This was passed through a short column of "Florisil 75 to 150 μm (100 to 200 mesh)" manufactured by Wako Pure Chemical Industries, Ltd., the solvent was removed by evaporation, and this was recrystallized from isopropyl alcohol to obtain 0.86 g (83%) of the compound represented by the chemical structural formula 6.

A liquid crystal temperature range was as follows:

Liquid crystal temperature range (at temperature raising): melting point 79° C.

Liquid crystal temperature range (at temperature lowering): 38 to 22° C.

Spectral data of the compound represented by the chemical structural formula 6 are shown below. Methods of measuring $^1$H-NMR, $^{13}$C-NMR and IR are the same as those described above.

<Regarding $^1$H-NMR>

$^1$H-NMR (400 MHz $CDCl_3$): δ 1.41-1.56 (m, 8H), 1.71 (quint, 4H, J=6.4 Hz), 1.81 (quint, 4H, J=6.6 Hz), 3.96 (t, 2H, J=6, 4 Hz), 3.97 (t, 2H, J=6.4 Hz), 4.17 (t, 4H, J=6.6 Hz), 5.81 (dd, 2H, J=1.5, 10.3 Hz), 6.12 (dd, 2H, J=10.3, 17.3 Hz), 6.39 (dd, 2H, J=1.5, 17.3 Hz), 6.91-6.96 (m, 4H), 7.11-7.21 (m, 4H), 7.29-7.36 (m, 3H), 7.51-7.53 (m, 2H)

<Regarding $^{13}$C-NMR>

$^{13}$C-NMR (100 MHz $CDCl_3$): δ 25.8, 28.6, 29.2, 64.5, 68.3, 87.2, 96.2, 115.2, 122.3, 122.4, 122.8, 124.8, 128.4, 128.6, 129.0, 129.1, 130.5, 131.2, 132.0, 133.0, 135.2, 135.6, 144.1, 144.2, 157.06, 157.12, 164.1, 164.5, 166.4

<Regarding IR>

IR (KBr, $cm^{-1}$): 2942, 2211, 1727, 1511, 1192

EXAMPLE 4

A liquid crystal composition solution in which 75 parts by weight of the compound of the chemical structural formula 6 obtained in Preparation Example 3, 25 parts by weight of a liquid crystal mixture of a polymerizable bar-like nematic liquid crystalline compound LC242 (manufactured by BASF), 3 parts by weight of a photopolymerization initiator Irgacure 819 (manufactured by Ciba Specialty Chemicals) and 0.05 parts by weight of an acrylic acid copolymer-based leveling agent ("BYK361" manufactured by Big Chemie) were dissolved in 200 parts by weight of cyclopentanone, was prepared. This liquid crystal composition solution was coated on a high refractive glass plate which had been prepared as in Example 3, and subjected to rubbing treatment, by a spin-coating method, to form a thin film. This thin film was dried for 1 minute in an air circulation constant temperature bath retained at 90° C.±1° C., and allowed to cool to room temperature to form a horizontally oriented nematic monodomain phase. Further, using a ultraviolet-ray irradiating apparatus using a metal halide lamp as a light source, ultraviolet-ray of 600 $mJ/cm^2$ was irradiated from a side of coating of a liquid crystal composition solution under the air atmosphere to perform photopolymerization, and the oriented state was fixed. Δn of the optical thin film prepared by changing a mixing ratio of the compound of the chemical structural formula 6 and LC242 like this was measured with an Abbe refractometer, and Δn was 0.060. In addition, wavelength dispersion property was measured using a spectroellipsometer, and $D_1$ (Re) was Re (450)/Re (550)=1.047, and $D_2$ (Re) was Re (650)/Re (550)=0.973.

EXAMPLE 5

Δn of the optical thin film obtained by using a liquid crystal composition of 50 parts by weight of the compound of the chemical structural formula 6, and LC242 (50 parts by weight) as in Example 4 was measured, and Δn was 0.080. In addition, wavelength dispersion property was measured using a spectroellipsometer, and $D_1$ (Re) was Re (450)/Re (550)=1.063, and $D_2$ (Re) was Re (650)/Re (550)=0.969.

COMPARATIVE EXAMPLE 2

Δn of the optical thin film obtained by using a liquid crystal composition of LC242 (100 parts by weight) was measured, and Δn was 0.131 ($n_e$=1.654, $n_o$=1.523). In addition, wavelength dispersion property was measured using a spectroellipsometer, and $D_1$ (Re) was Re (450)/Re (550)=1.082, and $D_2$ (Re) was Re (650)/Re (550)=0.960.

EXAMPLE 6

A liquid crystal composition solution used in Example 3 was coated on a stretched PET film immobilized on a glass plate by a bar coating method to form a thin film. This thin film was dried for 1 minute in an air circulating constant temperature bath retained at 90° C.±1° C., and allowed to cool to room temperature to form a horizontally oriented nematic monodomain phase. Further, using a ultraviolet-ray irradiating apparatus using a metal halide lamp as a light source, ultraviolet-ray of 600 mJ/cm² was irradiated from a side of coating of a liquid crystal composition solution under the air atmosphere to perform photopolymerization, and the oriented state was fixed. This optical thin film (a liquid crystal composition after orientation and fixation; corresponding to a part except for a glass plate and a stretched PET film in the present Example; its average thickness was 2.31 μm) was transferred onto a glass plate to prepare a 10 cm×10 cm sample. A retardation value Re (590) at in-plane nine places (see symbol 1 in the figure) at an equal interval was measured with a spectroellipsometer as shown in FIG. 1, and an average retardation value was 138.5 nm, and a retardation value variation was ±2.4 nm. In addition, a light transmittance at a wavelength of 590 nm measured with a ultraviolet and visible spectrophotometer was 92%.

COMPARATIVE EXAMPLE 3

Using the same procedure as that of Example 6, an optical thin film of LC242 was prepared. The resulting optical thin film (average thickness 1.07 μm) was transferred onto a glass plate to prepare a 10 cm×10 cm sample, a retardation value Re (590) of in-plane nine places at an equal interval was measured with a spectroellipsometer as shown in FIG. 1, and an average retardation value was 141.2 nm, and a retardation value variation was ±6.8 nm.

Like this, in the liquid crystal monomers of Examples 3 to 5, Δn was 0.046 to 0.080 which is a smaller value than that of the previous LC242 (Δn=0.131). In addition, in the phase difference film of Example 6 prepared using the liquid crystal monomer of Example 3, transparency is excellent as a light transmittance being 92% and, at the same time, even when a thickness of a phase difference film (thickness of optical thin film) is small as 2.31 μm, since a liquid crystal monomer showing smaller Δn than the previous Δn of 0.046 is used, a variation in a retardation value of a phase difference film (=Δn×thickness) becomes small. Therefore, a phase difference film by which coating at a desired small thickness is easy, and which is excellent in productivity can be obtained without being required to have an extremely high coating precision.

The invention claimed is:

1. A phase difference film obtained by orienting and fixing, on a substrate, a composition containing a polymerizable liquid crystal monomer represented by the following formula (I):

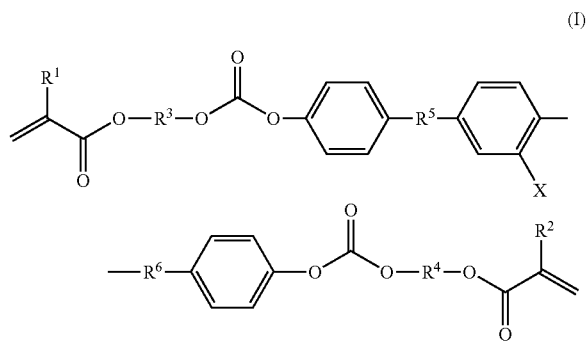

wherein, in the formula (I), X represents any one of Br, a halogen atom other than Br, -SMe and -SPh, $R^1$ and $R^2$ represent each independently a hydrogen atom or a methyl group, $R^3$ and $R^4$ represent each independently an alkylene group of a carbon number of 2 to 12, and $R^5$ and $R^6$ represent each independently —O—CO— or —CO—O—.

2. The phase difference film according to claim 1, wherein the polymerizable liquid crystal monomer is a polymerizable liquid crystal monomer represented by the following formula (II):

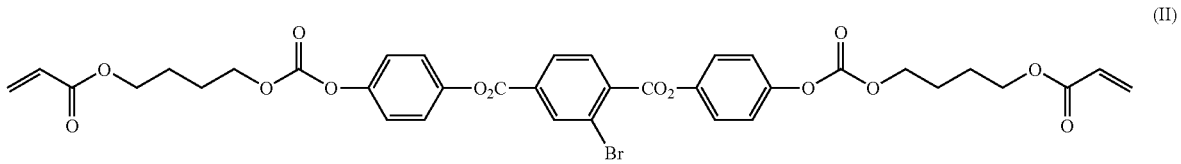

3. The phase difference film according to claim 1, wherein a birefringence index of the polymerizable liquid crystal monomer at a wavelength of 589 nm is 0.01 to 0.10.

4. The phase difference film according to claim 1, wherein the composition is cured by irradiation with ultraviolet-ray, and an irradiation amount of the ultraviolet-ray is 100 to 1500 mJ/cm².

5. The phase difference film according to claim 1, wherein a thickness of a composition after oriented and fixed on the substrate is 1 to 10 μm.

6. The phase difference film according to claim 1, wherein a light transmittance at a wavelength of 590 nm is 80% or higher.

7. The phase difference film according to claim 1, wherein a retardation value Re (590) in a phase difference film plane at a wavelength of 590 nm satisfies the following equation (1):

$$80 \text{ nm} \leq Re(590) \leq 800 \text{ nm} \tag{1}$$

wherein, Re (590)=(nx−ny)×d, nx means a refractive index in a slow axis direction (a direction at which a refractive index in a phase difference film plane becomes maximum) of a phase difference film, ny means a refractive index in a fast axis direction of a phase difference film, and d [nm] means a thickness of a phase difference film.

8. An optical film wherein the phase difference film as defined in claim 1 is laminated.

9. A polarizing plate wherein the phase difference film as defined in claim 1 is arranged at least on one side of a polarizer.

10. A polarizing plate wherein the optical film as defined in claim 8 is arranged at least on one side of a polarizer.

11. A liquid crystal panel provided with the phase difference film as defined in claim 1, and a liquid crystal cell.

12. A liquid crystal panel provided with the optical film as defined in claim 8, and a liquid crystal cell.

13. A liquid crystal panel provided with the polarizing plate as defined in claim 10, and a liquid crystal cell.

14. The liquid crystal panel according to claim 11, wherein the liquid crystal cell is TN mode, VA mode, IPS mode or OCB mode.

15. A liquid crystal display device wherein said device is provided with the liquid crystal panel as defined in claim 11.

* * * * *